(12) United States Patent
Watano et al.

(10) Patent No.: US 12,730,255 B2
(45) Date of Patent: Sep. 8, 2026

(54) OPTICAL ELEMENT

(71) Applicant: FUJIFILM Corporation, Tokyo (JP)

(72) Inventors: Akiko Watano, Minamiashigara (JP); Ryuji Saneto, Minamiashigara (JP); Katsumi Sasata, Minamiashigara (JP); Fumitake Mitobe, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/192,119

(22) Filed: Mar. 29, 2023

(65) Prior Publication Data

US 2023/0236353 A1 Jul. 27, 2023

Related U.S. Application Data

(63) Continuation of application No. PCT/JP2021/034060, filed on Sep. 16, 2021.

(30) Foreign Application Priority Data

Sep. 30, 2020 (JP) ................................ 2020-165968

(51) Int. Cl.
*F21V 8/00* (2006.01)
*G02B 27/01* (2006.01)

(52) U.S. Cl.
CPC ......... *G02B 6/0056* (2013.01); *G02B 6/0026* (2013.01); *G02B 6/005* (2013.01);
(Continued)

(58) Field of Classification Search
None
See application file for complete search history.

(56) References Cited

U.S. PATENT DOCUMENTS 5,712,694 A * 1/1998 Taira .................... G02B 6/0023 349/9
8,064,035 B2 * 11/2011 Escuti .................. G02F 1/1323 349/193

(Continued)

FOREIGN PATENT DOCUMENTS

CN 1688906 A 10/2005
CN 102317818 A 1/2012

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/034060, dated Apr. 13, 2023.

(Continued)

*Primary Examiner* — Richard H Kim
(74) *Attorney, Agent, or Firm* — Birch, Stewart, Kolasch & Birch, LLP

(57) ABSTRACT

Provided is an optical element that can display a clear image having no blurriness in AR glasses or the like. The optical element includes: a substrate; and a laminate that is provided on the substrate and where a plurality of liquid crystal layers obtained by aligning a liquid crystal compound are laminated, in which the liquid crystal layers have a liquid crystal alignment pattern in which a direction of an optical axis derived from the liquid crystal compound changes while continuously rotating in at least one in-plane direction, and in at least one of the liquid crystal layers, an arithmetic mean value of differences between maximum film thicknesses and minimum film thicknesses obtained by observing 10 cross-sections with a scanning electron microscope is 0.1 μm or less.

22 Claims, 8 Drawing Sheets

(52) U.S. Cl.
CPC .. *G02B 27/0172* (2013.01); *G02B 2027/0147* (2013.01); *G02B 2027/0178* (2013.01)

(56) References Cited

U.S. PATENT DOCUMENTS

| | | | | |
|---|---|---|---|---|
| 11,435,629 | B2 | 9/2022 | Sato et al. | |
| 2002/0176167 | A1 | 11/2002 | Kashima | |
| 2003/0071960 | A1 * | 4/2003 | Umeya | G02B 5/3016 349/187 |
| 2003/0090618 | A1 | 5/2003 | Kashima | |
| 2006/0093803 | A1 | 5/2006 | Hwang et al. | |
| 2006/0164579 | A1 | 7/2006 | Yano | |
| 2007/0097313 | A1 | 5/2007 | Hayashi et al. | |
| 2010/0225876 | A1 | 9/2010 | Escuti et al. | |
| 2011/0102728 | A1 | 5/2011 | Mizuno et al. | |
| 2011/0304782 | A1 | 12/2011 | Akao et al. | |
| 2012/0086903 | A1 | 4/2012 | Escuti et al. | |
| 2013/0027656 | A1 | 1/2013 | Escuti et al. | |
| 2017/0343807 | A1 | 11/2017 | Anzai et al. | |
| 2017/0373459 | A1 | 12/2017 | Weng et al. | |
| 2018/0164480 | A1 | 6/2018 | Yoshida | |
| 2019/0030856 | A1 | 1/2019 | Hayasaki et al. | |
| 2021/0033764 | A1 * | 2/2021 | Sato | G02B 5/3016 |
| 2021/0149248 | A1 | 5/2021 | Saitoh et al. | |
| 2021/0208316 | A1 | 7/2021 | Sato et al. | |
| 2021/0231985 | A1 | 7/2021 | Sato et al. | |
| 2021/0373218 | A1 | 12/2021 | Saitoh et al. | |
| 2025/0044737 | A1 | 2/2025 | Funayama et al. | |

FOREIGN PATENT DOCUMENTS

| | | | | |
|---|---|---|---|---|
| CN | 106980216 | A | 7/2017 | |
| CN | 111367004 | A | 7/2020 | |
| CN | 111527428 | A | 8/2020 | |
| DE | 103 57 047 | A1 | 7/2005 | |
| JP | 2002-258053 | A | 9/2002 | |
| JP | 2003-21720 | A | 1/2003 | |
| JP | 2007-219364 | A | 8/2007 | |
| JP | 2008-532085 | A | 8/2008 | |
| JP | 2009-145403 | A | 7/2009 | |
| JP | 2010-525394 | A | 7/2010 | |
| JP | 2012-9126 | A | 1/2012 | |
| JP | 2012-88132 | A | 4/2012 | |
| JP | 2014-528597 | A | 10/2014 | |
| JP | 2015-93399 | A | 5/2015 | |
| JP | 2019-35912 | A | 3/2019 | |
| JP | 2019-132902 | A | 8/2019 | |
| WO | WO 2016/133186 | A1 | 8/2016 | |
| WO | WO 2016/194961 | A1 | 12/2016 | |
| WO | WO 2017/175852 | A1 | 10/2017 | |
| WO | WO 2019/194291 | A1 | 10/2019 | |
| WO | WO-2019189641 | A1 * | 10/2019 | G02B 5/3016 |
| WO | WO 2020/022434 | A1 | 1/2020 | |
| WO | WO 2020/066429 | A1 | 4/2020 | |
| WO | WO 2020/075711 | A1 | 4/2020 | |
| WO | WO 2020/162476 | A1 | 8/2020 | |
| WO | WO 2020/166691 | A1 | 8/2020 | |

OTHER PUBLICATIONS

International Search Report (Form PCT/ISA/210) for International Application No. PCT/JP2021/034060, dated Dec. 14, 2021, with English translation.
Kress et al., "Towards the Ultimate Mixed Reality Experience: Hololens Display Architecture Choices," SID 2017 Digest, 2017, pp. 127-131.
Japanese Notice of Reasons for Refusal for corresponding Japanese Application No. 2022-553809 dated Dec. 12, 2023, with an English translation.
Japanese Office Action for corresponding Japanese Application No. 2022-553809, dated Jul. 9, 2024, with English translation.
Japanese Office Action for corresponding Japanese Application No. 2022-553809, dated Dec. 3, 2024, with English translation.
Chinese Office Action for corresponding Chinese Application No. 202180067101.9 dated Apr. 16, 2025, with English translation.
Japanese Reconsideration Report by Examiner before Appeal for corresponding Japanese Application No. 2022-553809, dated May 12, 2025, with an English translaton.
Chinese Office Action for corresponding Chinese Application No. 202180067101.9, dated Nov. 25, 2025, with partial English translation.
Japanese Office Action for corresponding Japanese Application No. 2022-553809, dated Feb. 24, 2026, with English translation.
Japanese Office Action for corresponding Japanese Applicatipn No. 2025-032958, dated Feb. 10, 2025, with English translation.
Japanese Office Action for corresponding Japanese Application No. 2025-032958, dated Apr. 28, 2026, with English translation.

* cited by examiner 40
40
40
40
40A
D
40
Λ
34
Y
X

OPTICAL ELEMENT

CROSS-REFERENCE TO RELATED APPLICATIONS

This application is a Continuation of PCT International Application No. PCT/JP2021/034060 filed on Sep. 16, 2021, which claims priority under 35 U.S.C. § 119(a) to Japanese Patent Application No. 2020-165968 filed on Sep. 30, 2020. The above applications are hereby expressly incorporated by reference, in its entirety, into the present application.

BACKGROUND OF THE INVENTION

1. Field of the Invention

The present invention relates to an optical element that is used for AR glasses or the like.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that a virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light propagates in the light guide plate. The light propagated in the light guide plate is also diffracted by the diffraction element in the other end part of the light guide plate and is emitted from the light guide plate such that the light is irradiated (projected) to an observation position by the user.

As an example of the diffraction element that can be used for AR glasses and allows light to be incident into the light guide plate and to be emitted from the light guide plate, a reflective structure described in WO2016/194961A including a cholesteric liquid crystal layer that is obtained by immobilizing a cholesteric liquid crystalline phase can be used.

This reflective structure includes a plurality of helical structures each of which extends in a predetermined direction. In addition, this reflective structure includes: a first incident surface that intersects the predetermined direction and into which light is incident; and a reflecting surface that intersects the predetermined direction and reflects the light incident from the first incident surface, in which the first incident surface includes one of two end parts in each of the plurality of helical structures. In addition, each of the plurality of helical structures includes a plurality of structural units that lies in the predetermined direction, and each of the plurality of structural units includes a plurality of elements that are helically turned and laminated. In addition, each of the plurality of structural units includes a first end part and a second end part, the second end part of one structural unit among structural units adjacent to each other in the predetermined direction forms the first end part of the other structural unit, and alignment directions of the elements positioned in the plurality of first end parts in the plurality of helical structures are aligned. Further, the reflecting surface includes at least one first end part in each of the plurality of helical structures and is not parallel to the first incident surface.

The cholesteric liquid crystal layer (reflective structure) described in WO2016/194961A has a liquid crystal alignment pattern in which a direction of an optical axis derived from a liquid crystal compound changes while continuously rotating in at least one in-plane direction. The cholesteric liquid crystal layer described in WO2016/194961A has the above-described liquid crystal alignment pattern to include the reflecting surface that is not parallel to the first incident surface.

A general cholesteric liquid crystal layer reflects incident light by specular reflection.

On the other hand, the cholesteric liquid crystal layer described in WO2016/194961A diffracts incident light to reflect the light at an angle in a predetermined direction with respect to specular reflection instead of specular reflection. For example, in the cholesteric liquid crystal layer described in WO2016/194961A, light incident from the normal direction is diffracted and reflected in a state where it is tilted with respect to the normal direction instead of being reflected in the normal direction.

Accordingly, by using the cholesteric liquid crystal layer as a diffraction element for incidence into the light guide plate, an image projected from a display is diffracted such that the light can be introduced into the light guide plate at an angle and can be totally reflected an propagate in the light guide plate.

In addition, by using the cholesteric liquid crystal layer as a diffraction element for emission from the light guide plate, light propagated in the light guide plate is diffracted such that the diffracted light can be emitted from the light guide plate.

SUMMARY OF THE INVENTION

As described above, in the reflective structure including the cholesteric liquid crystal layer described in WO2016/194961A, incident circularly polarized light is diffracted by the cholesteric liquid crystal layer such that the circularly polarized light can be reflected in a state where it is tilted with respect to an incidence direction.

As is well known, the cholesteric liquid crystal layer selectively reflects light in a predetermined wavelength range depending on a helical pitch of a helical structure of a liquid crystal compound. Accordingly, the cholesteric liquid crystal layer can also be used for AR glasses that display a full color image, for example, by laminating and using the cholesteric liquid crystal layers that selectively reflect light components of respective colors corresponding to red light, green light, and blue light.

Here, according to an investigation by the present inventors, it was found that, in a diffraction element including liquid crystal layers, in a case where a plurality of liquid crystal layers are laminated, there may be a variation in diffraction angle in an in-plane direction of a liquid crystal layer.

In a case where the diffraction element having a variation in diffraction angle in the in-plane direction is used for AR glasses, blurriness occurs in an image to be displayed.

An object of the present invention is to solve the above-described problem of the related art and to provide an optical element including a plurality of liquid crystal layers that are laminated on a substrate, in which a variation in diffraction angle of a liquid crystal layer in an in-plane direction is suppressed and a clear image can be displayed without blurriness in the image for use in AR glasses or the like.

In order to achieve the object, a method of manufacturing an optical element according to an aspect of the present invention has the following configurations.

[1] An optical element comprising:

a substrate; and a laminate that is provided on the substrate and where a plurality of liquid crystal layers obtained by aligning a liquid crystal compound are laminated, in which the liquid crystal layers forming the laminate have a liquid crystal alignment pattern in which a direction of an optical axis derived from the liquid crystal compound changes while continuously rotating in at least one in-plane direction, and at least one of the liquid crystal layers forming the laminate satisfy the following film thickness distribution requirement, film thickness distribution requirement a cross-section of the liquid crystal layer in a thickness direction is observed with a scanning electron microscope at a magnification of 10000-fold while continuously moving an observation position in an in-plane direction of the liquid crystal layer to perform an operation in which 20 images in a range of 200 μm in the in-plane direction of the liquid crystal layer are acquired to acquire a difference between a maximum film thickness and a minimum film thickness in the range of 200 μm in the in-plane direction of the liquid crystal layer, and in a case where this operation is performed on any 10 cross-sections of the liquid crystal layer, an arithmetic mean value of the acquired differences between the maximum film thicknesses and the minimum film thicknesses in the 10 cross-sections is 0.1 μm or less.

[2] The optical element according to [1], in which among the liquid crystal layers forming the laminate, a liquid crystal layer that is positioned at an end part in a laminating direction satisfies the film thickness distribution requirement.

[3] The optical element according to [2], in which among the liquid crystal layers forming the laminate, a liquid crystal layer that is closest to the substrate side satisfies the film thickness distribution requirement.

[4] The optical element according to any one of [1] to [3], in which among the liquid crystal layers forming the laminate, liquid crystal layers other than a liquid crystal layer that is most distant from the substrate satisfy the film thickness distribution requirement.

[5] The optical element according to any one of [1] to [4], in which all of the liquid crystal layers forming the laminate satisfy the film thickness distribution requirement.

[6] The optical element according to any one of [1] to [5], in which the liquid crystal layers forming the laminate are cholesteric liquid crystal layers obtained by immobilizing a cholesteric liquid crystalline phase.

[7] The optical element according to any one of [1] to [6], in which the substrate is a light guide plate and includes an incidence portion that causes light to be incident into the light guide plate and an emission portion that emits light from the light guide plate, and at least one of the incidence portion or the emission portion is formed of the laminate.

[8] The optical element according to [7], in which the incidence portion is formed of the laminate.

[9] The optical element according to [8], in which the emission portion is formed of the laminate.

According to an aspect of the present invention, a method of manufacturing an optical element that can display a clear image having no blurriness in AR glasses or the like can be provided.

DESCRIPTION OF THE PREFERRED EMBODIMENTS

Hereinafter, an optical element according to an embodiment of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although the present invention is not limited thereto, infrared light (infrared ray) refers to light in a wavelength range of longer than 780 nm and 1 mm or shorter. In particular, a near infrared range refers to light in a wavelength range of longer than 780 nm and 2000 nm or shorter.

Further, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
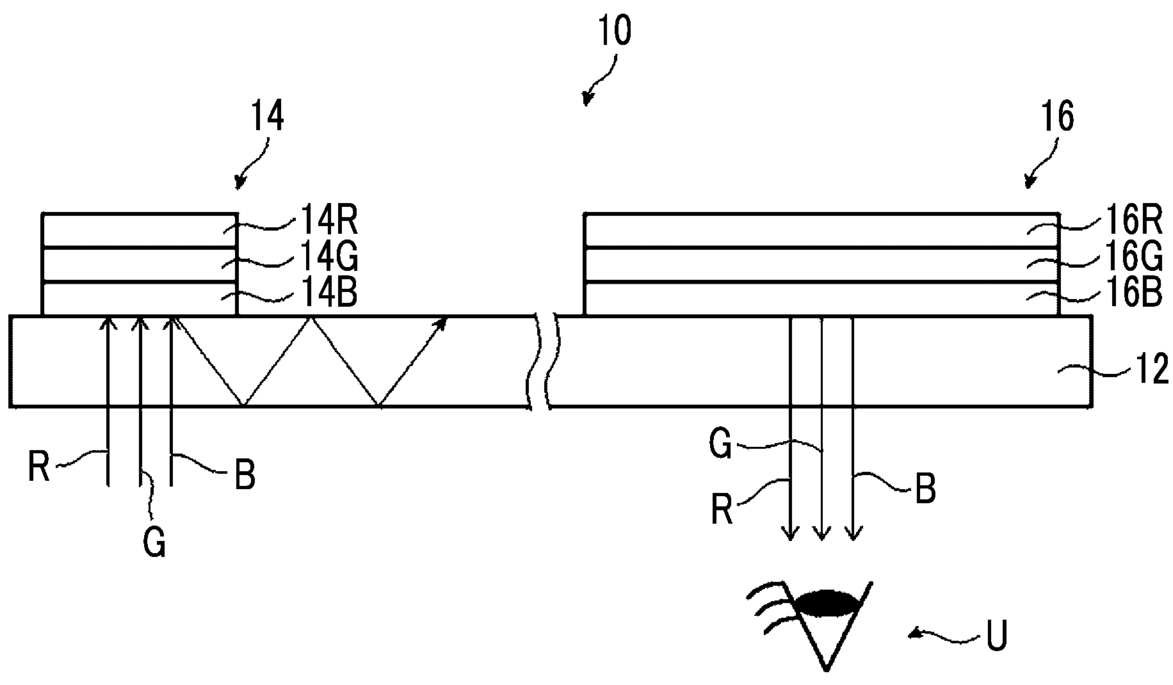
FIG. 1 is a diagram conceptually showing an example of an optical element according to the present invention.

FIG. 1 is a diagram conceptually showing an example of the optical element according to the embodiment of the present invention.

As shown in FIG. 1, an optical element 10 includes a light guide plate 12, an incidence portion 14, and an emission portion 16. The incidence portion 14 is provided in the vicinity of one end part of one main surface of the light guide plate 12, and the emission portion 16 is provided in the vicinity of another end part of the same main surface of the light guide plate 12. The main surface is the maximum surface of a sheet-shaped material (for example, a plate-shaped material, a film, or a layer).

The optical element 10 in the example shown in the drawing is used, for example, for the above-described AR glasses or the like and corresponds to display of a full color image consisting of a red image R, a green image G, and a blue image B.

In the AR glasses including the optical element 10, for example, the image (video) consisting of the red image R, the green image G, and the blue image B that is displayed by a display (optical engine) not shown transmits through the light guide plate 12 to be incident into the incidence portion 14. By allowing the incidence portion 14 to diffract and reflect incident light (image), the light is incident into the light guide plate 12 at an angle where total reflection can occur.

Light that propagates (is guided) in the light guide plate 12 while repeating total reflection is incident into the emission portion 16. By allowing the emission portion 16 to diffract and reflect incident light, the red image R, the green image G, and the blue image B are emitted from the light guide plate 12 such that the virtual image is displayed to be superimposed on a scene that is actually being seen by a user U.

The incidence portion 14 includes an R incidence liquid crystal layer 14R, a G incidence liquid crystal layer 14G, and a B incidence liquid crystal layer 14B.

In a preferable aspect, the R incidence liquid crystal layer 14R, the G incidence liquid crystal layer 14G, and the B incidence liquid crystal layer 14B are reflective liquid crystal diffraction elements consisting of a cholesteric liquid crystal layer having a predetermined liquid crystal alignment pattern. The R incidence liquid crystal layer 14R selectively diffracts and reflects red (R) light, the G incidence liquid crystal layer 14G selectively diffracts and reflects green (G) light, and the B incidence liquid crystal layer 14B selectively diffracts and reflects blue (B) light.

On the other hand, the emission portion 16 includes an R emission liquid crystal layer 16R, a G emission liquid crystal layer 16G, and a B emission liquid crystal layer 16B.

In a preferable aspect, the R emission liquid crystal layer 16R, the G emission liquid crystal layer 16G, and the B emission liquid crystal layer 16B are reflective liquid crystal diffraction elements consisting of a cholesteric liquid crystal layer having a predetermined liquid crystal alignment pattern. The R emission liquid crystal layer 16R selectively diffracts and reflects red light, the G emission liquid crystal layer 16G selectively diffracts and reflects green light, and the B emission liquid crystal layer 16B selectively diffracts and reflects blue light.

As is well known, the cholesteric liquid crystal layer selectively reflects right or left circularly polarized light in a predetermined wavelength range, and allows transmission of the other light. Accordingly, the user U can observe a scenery opposite to the emission portion 16 through the light guide plate 12 and the emission portion 16.

The light guide plate 12 is the substrate according to the embodiment of the present invention. In addition, each of the incidence portion 14 and the emission portion 16 are a laminate that is provided on the substrate and where a plurality of liquid crystal layers are laminated in the optical element according to the embodiment of the present invention.

Accordingly, at least one of the R incidence liquid crystal layer 14R, the G incidence liquid crystal layer 14G, and the B incidence liquid crystal layer 14B in the incidence portion 14 satisfies a predetermined film thickness distribution requirement. In addition, at least one of the R emission liquid crystal layer 16R, the G emission liquid crystal layer 16G, and the B emission liquid crystal layer 16B in the emission portion 16 satisfies the predetermined film thickness distribution requirement described below.

In the optical element according to the embodiment of the present invention, the incidence portion 14 and the emission portion 16 are not limited to this configuration. That is, each of the incidence portion 14 and the emission portion 16 may include two cholesteric liquid crystal layers or may include four or more cholesteric liquid crystal layers as long as it includes a plurality of cholesteric liquid crystal layers.

Accordingly, the optical element according to the embodiment of the present invention is not limited to an element corresponding to a full color image of three colors and, for example, may be a color image of two colors such as red and blue or red and green, may be an element corresponding to a color image of four or more colors, or may be an element corresponding to invisible light such as infrared light.

In addition, the cholesteric liquid crystal layers in the incidence portion 14 and the emission portion 16 are not limited to a cholesteric liquid crystal layer that selectively reflects red light, a cholesteric liquid crystal layer that selectively reflects green light, and a liquid crystal layer that selectively reflects blue light.

The cholesteric liquid crystal layers in the incidence portion 14 and the emission portion 16 may be, for example, a cholesteric liquid crystal layer that selectively reflects red light and green light, a cholesteric liquid crystal layer that selectively reflects green light and blue light, a cholesteric liquid crystal layer that selectively reflects infrared light, and a cholesteric liquid crystal layer that selectively reflects ultraviolet light.

That is, in the optical element according to the embodiment of the present invention, the incidence portion 14 and the emission portion 16, that is, the laminate where a plurality of liquid crystal layers are laminated can adopt various layer configurations as long as it includes two or more liquid crystal layers and at least one of the liquid crystal layers satisfy the above-described film thickness distribution requirement.

Note that, irrespective of the layer configuration, basically, the incidence portion 14 and the emission portion 16 include a liquid crystal layer that selectively reflects light color of the same color (wavelength range).

Hereinafter, each of the components in the optical element 10 according to the embodiment of the present invention will be described.

[Light Guide Plate]

The light guide plate 12 is a well-known light guide plate that reflects light incident thereinto and propagates (guides) the reflected light.

As the light guide plate 12, various well-known light guide plates used for a backlight unit or the like of AR glasses or a liquid crystal display can be used without any particular limitation.

[Incidence Portion and Emission Portion]

The incidence portion 14 includes the R incidence liquid crystal layer 14R, the G incidence liquid crystal layer 14G, and the B incidence liquid crystal layer 14B.

As described above, in a preferable aspect, each of the incidence liquid crystal layers is a cholesteric liquid crystal layer having a predetermined liquid crystal alignment pattern obtained by immobilizing a cholesteric liquid crystalline phase, and is a reflective liquid crystal diffraction element that selectively reflects right circularly polarized light or left circularly polarized light.

In the R incidence liquid crystal layer 14R, the G incidence liquid crystal layer 14G, and the B incidence liquid crystal layer 14B, the turning directions of circularly polarized light to be selectively reflected, that is, the helical twisted directions of the liquid crystal compounds in the cholesteric liquid crystalline phases may be the same as or different from each other.

On the other hand, the emission portion 16 includes the R emission liquid crystal layer 16R, the G emission liquid crystal layer 16G, and the B emission liquid crystal layer 16B.

As described above, in a preferable aspect, each of the emission liquid crystal layers is a cholesteric liquid crystal layer having a predetermined liquid crystal alignment pattern obtained by immobilizing a cholesteric liquid crystalline phase, and is a reflective liquid crystal diffraction element that selectively reflects right circularly polarized light or left circularly polarized light.

In the R emission liquid crystal layer 16R, the G emission liquid crystal layer 16G, and the B emission liquid crystal layer 16B, the turning directions of circularly polarized light to be selectively reflected, that is, the helical twisted directions of the liquid crystal compounds in the cholesteric liquid crystalline phases may be the same as or different from each other.

The R incidence liquid crystal layer 14R, the G incidence liquid crystal layer 14G, and the B incidence liquid crystal layer 14B have the same configuration and the R emission liquid crystal layer 16R, the G emission liquid crystal layer 16G, and the B emission liquid crystal layer 16B have basically the same configuration, except that the wavelength ranges of light to be selectively reflected and/or the turning directions of circularly polarized light to be selectively reflected are different from each other.

Accordingly, in the following description, in a case where the liquid crystal layers do not need to be distinguished from each other, these liquid crystal layers will also be collectively referred to as "liquid crystal layer".

(Liquid Crystal Layer)

The liquid crystal layer will be described using FIGS. 2 to 4.

Figure 2:
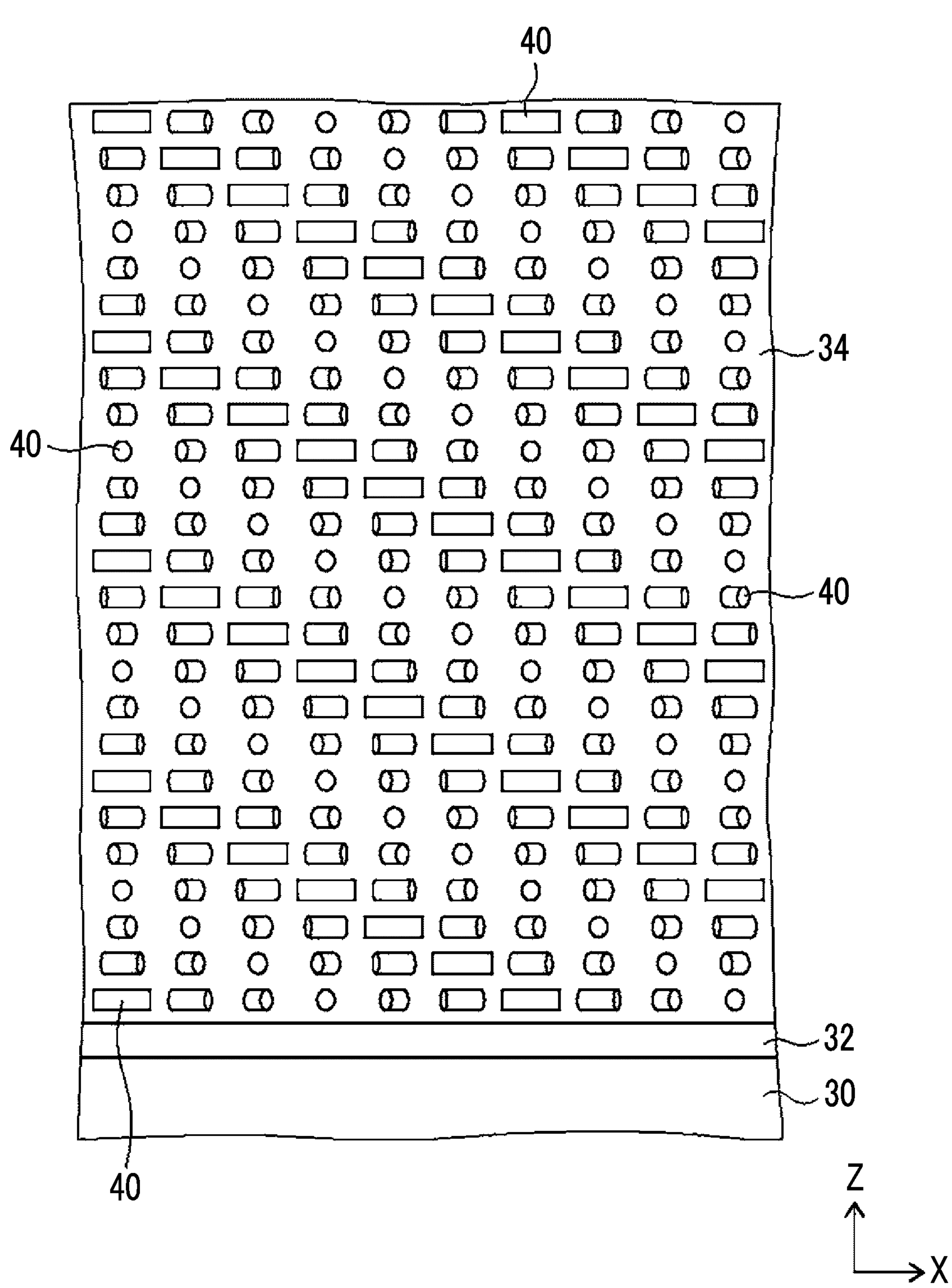
FIG. 2 is a conceptual diagram showing a cholesteric liquid crystal layer.

Regarding a cholesteric liquid crystal layer 34 having a predetermined liquid crystal alignment pattern, for example, as conceptually shown in FIG. 2, a photo-alignment film 32 is formed on a support 30, and the cholesteric liquid crystal layer 34 is formed on the photo-alignment film 32. The cholesteric liquid crystal layer 34 functions as each of the incidence liquid crystal layers and the emission liquid crystal layers as the reflective liquid crystal diffraction elements forming the incidence portion 14 and the emission portion 16.

Although described below, in the optical element according to the embodiment of the present invention, the cholesteric liquid crystal layer 34 is peeled off from the photo-alignment film 32 and is transferred and laminated as a liquid crystal layer (an incidence liquid crystal layer or an emission liquid crystal layer) on the light guide plate 12 as the substrate or the lower liquid crystal layer.

Figures 3, 4:
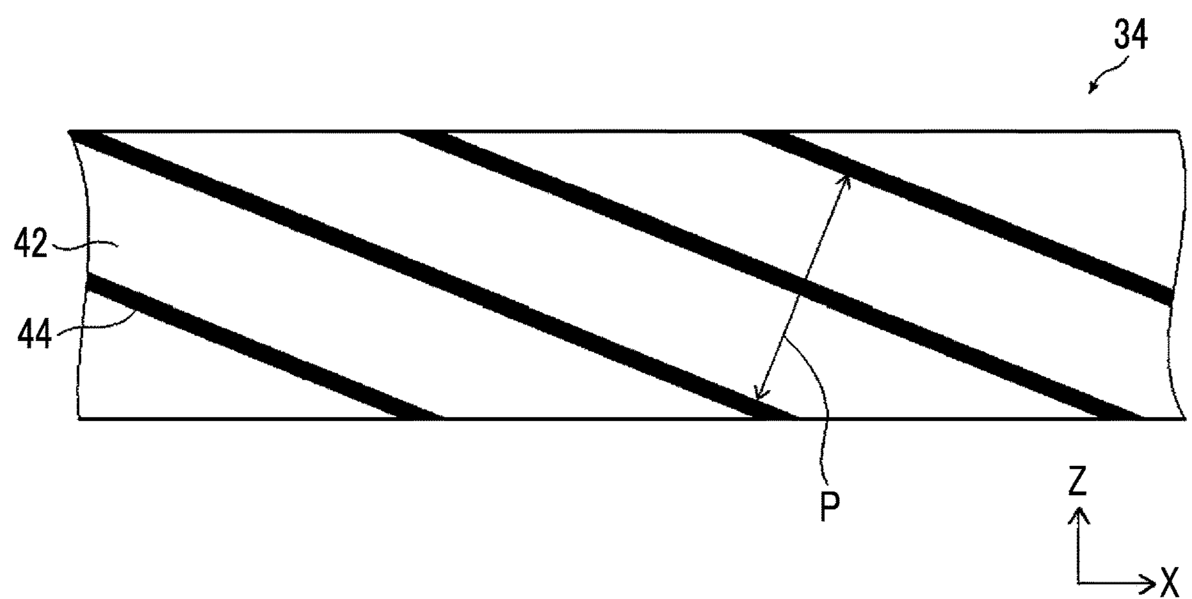
FIG. 3 is a plan view conceptually showing the cholesteric liquid crystal layer shown in FIG. 2.
FIG. 4 is a diagram conceptually showing a cross-sectional SEM image of the cholesteric liquid crystal layer shown in FIG. 3.

FIG. 3 is a schematic diagram showing an alignment state of a liquid crystal compound in a plane of a main surface of the cholesteric liquid crystal layer 34.

In the following description, it is assumed that a main surface of the cholesteric liquid crystal layer 34 is an X-Y plane and a cross-section perpendicular to the X-Y plane is a X-Z plane. That is, FIG. 2 corresponds to a schematic diagram of the X-Z plane of the cholesteric liquid crystal layer 34, and FIG. 3 corresponds to a schematic diagram of the X-Y plane of the cholesteric liquid crystal layer 34.

As shown in FIGS. 2 to 4, the cholesteric liquid crystal layer 34 is a layer obtained by cholesteric alignment of a liquid crystal compound. In addition, FIGS. 2 to 4 show an example in which the liquid crystal compound forming the cholesteric liquid crystal layer 34 is a rod-like liquid crystal compound.

<Support>

The support 30 supports the photo-alignment film 32 and the cholesteric liquid crystal layer 34.

As the support 30, various sheet-shaped materials (films or plate-shaped materials) can be used as long as they can support the photo-alignment film 32 and the cholesteric liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the photo-alignment film 32 and the cholesteric liquid crystal layer 34 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

In particular, from the viewpoint that, for example, the photo-alignment film 32 having high surface smoothness can be formed, glass is suitably used as the support 30.

<Photo-Alignment Film>

In the liquid crystal diffraction element, the photo-alignment film 32 is formed on a surface of the support 30.

The photo-alignment film 32 is a photo-alignment film for aligning the liquid crystal compound 40 to a predetermined liquid crystal alignment pattern during the formation of the cholesteric liquid crystal layer 34.

Although described below, in the present invention, the cholesteric liquid crystal layer 34 has a liquid crystal alignment pattern in which a direction of an optical axis 40A (refer to FIG. 3) derived from the liquid crystal compound 40 changes while continuously rotating in one in-plane direction. Accordingly, the photo-alignment film 32 forms an alignment pattern such that the cholesteric liquid crystal layer 34 can form the liquid crystal alignment pattern.

In the following description, "the direction of the optical axis 40A rotates" will also be simply referred to as "the optical axis 40A rotates".

In the present invention, the photo-alignment film 32 includes a photo-alignment material. The photo-alignment film 32 is a so-called photo-alignment film obtained by irradiating a photo-alignment material with polarized light or non-polarized light.

The photo-alignment film 32 is formed by applying a composition including a photo-alignment material to the support 30 and, through interference exposure, forms an alignment pattern such that a direction of an optical axis 40A (refer to FIG. 3) derived from the liquid crystal compound 40 of the cholesteric liquid crystal layer 34 changes while continuously rotating in one in-plane direction.

Preferable examples of the photo-alignment material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the photo-alignment film 32 is not particularly limited. The thickness with which a required alignment function can be obtained may be appropriately set depending on the material for forming the photo-alignment film 32.

The thickness of the photo-alignment film 32 is preferably 0.01 to 5 μm and more preferably 0.05 to 2 μm.

A method of forming the photo-alignment film 32 is not limited. Any one of various well-known methods corresponding to a material for forming the photo-alignment film 32 can be used.

Examples of the method of forming the photo-alignment film 32 include a method including: preparing a composition including a photo-alignment material for forming the photo-alignment film 32; applying this composition to a surface of the support 30; drying the applied photo-alignment film 32; and performing interference exposure on the photo-alignment film 32 using laser light to form an alignment pattern.

Figure 8:
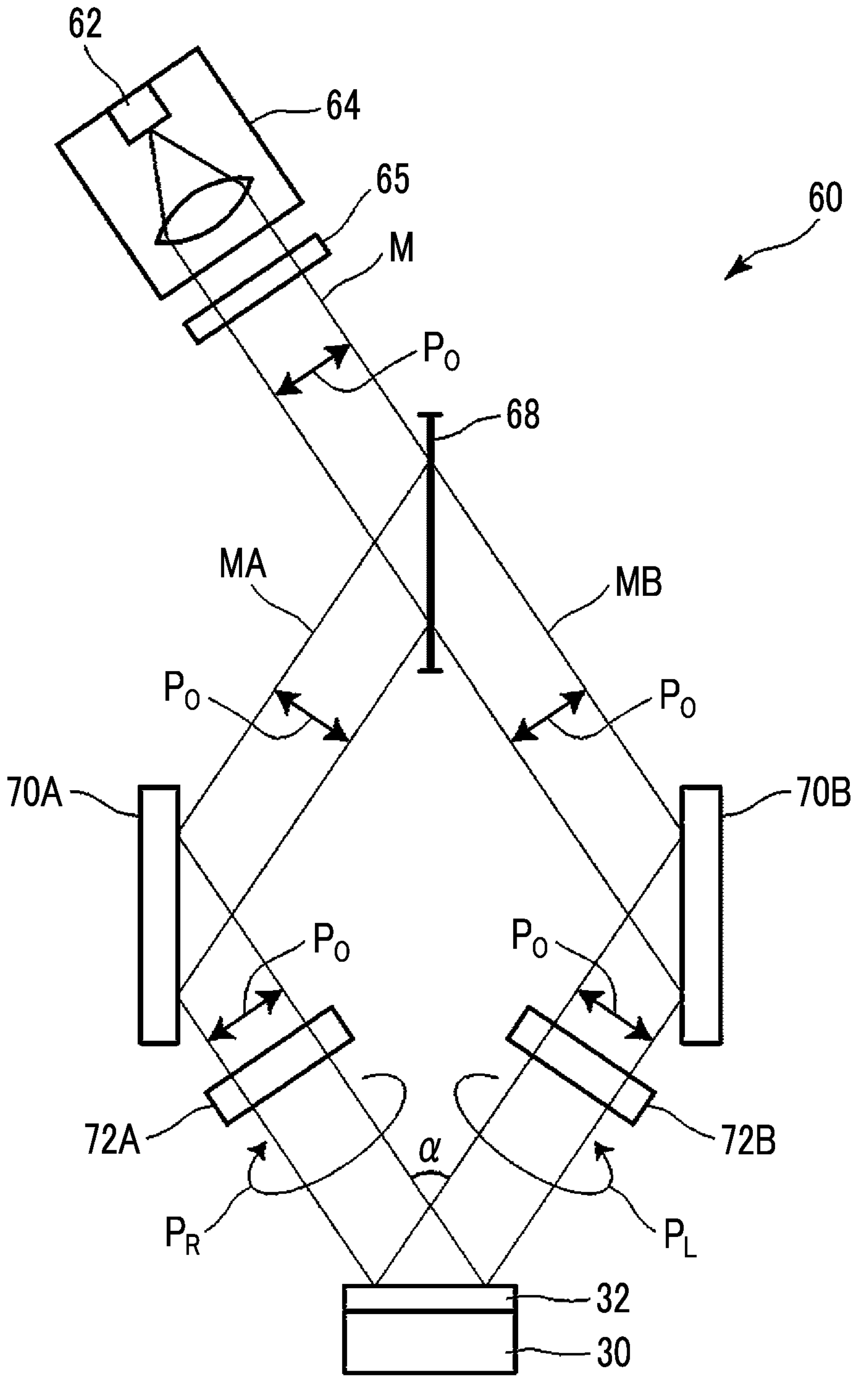
FIG. 8 is a conceptual diagram showing an example of an exposure device that exposes a photo-alignment film.

FIG. 8 conceptually shows an example of an exposure device that performs interference exposure on the photo-alignment film 32 to form an alignment pattern.

An exposure device 60 shown in FIG. 8 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the photo-alignment film 32 on which the alignment pattern is not yet formed is disposed at an exposed portion, the two beams MA and MB intersect and interfere with each other on the photo-alignment film 32, and the photo-alignment film 32 is irradiated with and exposed to the interference light.

Due to the interference in this case, the polarization state of light with which the photo-alignment film 32 is irradiated periodically changes according to interference fringes. As a result, a photo-alignment film having an alignment pattern in which the alignment state periodically changes can be obtained. In the following description, this photo-alignment film having the alignment pattern will also be referred to as "patterned photo-alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the photo-alignment film 32 having the alignment pattern in which the alignment state periodically changes, as described below, the cholesteric liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned photo-alignment film has the alignment pattern for aligning the liquid crystal compound to have the liquid crystal alignment pattern in which the direction of the optical axis of the liquid crystal compound in the liquid crystal layer formed on the patterned photo-alignment film changes while continuously rotating in at least one in-plane direction.

In a case where an axis in the direction in which the liquid crystal compound is aligned is an alignment axis, it can be said that the patterned photo-alignment film has an alignment pattern in which the direction of the alignment axis changes while continuously rotating in at least one in-plane direction. The alignment axis of the patterned photo-alignment film can be detected by measuring absorption anisotropy. For example, in a case where the amount of light transmitted through the patterned photo-alignment film is measured by irradiating the patterned photo-alignment film with linearly polarized light while rotating the patterned photo-alignment film, it is observed that a direction in which the light amount is the maximum or the minimum gradually changes in the one in-plane direction.

<Cholesteric Liquid Crystal Layer (Incidence Liquid Crystal Layer/Emission Liquid Crystal Layer)>

The cholesteric liquid crystal layer 34 is formed on a surface of the photo-alignment film 32.

The cholesteric liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the cholesteric liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (helical pitch P), and plural pitches of the helically turned liquid crystal compound 40 are laminated.

It is known that the cholesteric liquid crystalline phase exhibits selective reflectivity where light in a specific wavelength range is selectively reflected.

A central wavelength of selective reflection (selective reflection center wavelength k) of a cholesteric liquid crystalline phase depends on the length of one helical pitch P (helical pitch P) in the cholesteric liquid crystalline phase and satisfies a relationship of $\lambda = n \times P$ with an average refractive index n of the cholesteric liquid crystalline phase.

Therefore, the selective reflection center wavelength, that is, the selective reflection wavelength range can be adjusted by adjusting the helical pitch. The selective reflection center wavelength of the cholesteric liquid crystalline phase increases as the helical pitch P increases.

The helical pitch of the cholesteric liquid crystalline phase depends on the kind of the chiral agent used together with the liquid crystal compound 40 and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a sense of helix and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, a half-width $\Delta\lambda$ (nm) of a wavelength range (circularly polarized light reflection wavelength range) where selective reflection is exhibited depends on $\Delta n$ of the cholesteric liquid crystalline phase and the helical pitch P and satisfies a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the optical element (liquid crystal diffraction element) and may be, for example, 10 to 500 nm and is preferably 20 to 300 nm and more preferably 30 to 100 nm.

As is well known, the cholesteric liquid crystalline phase exhibits selective reflectivity with respect to left or circularly polarized light in a specific wavelength range. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, for example, in the incidence portion 14, in a case where the R incidence liquid crystal layer 14R, the G incidence liquid crystal layer 14G, and the B incidence liquid crystal layer 14B selectively reflect right circularly polarized light, helical twisted directions of the cholesteric liquid crystalline phases in the cholesteric liquid crystal layers 34 as the liquid crystal layers thereof are right directions.

A twisted direction of the cholesteric liquid crystalline phase can be adjusted by adjusting the kind of the liquid crystal compound that forms the cholesteric liquid crystal layer and/or the kind of the chiral agent to be added.

As shown in FIG. 3, in the X-y plane of the cholesteric liquid crystal layer 34, the liquid crystal compounds 40 are arranged along a plurality of arrangement axes D parallel to the X-y plane. On each of the arrangement axes D, the direction of the optical axis 40A of the liquid crystal compound 40 changes while continuously rotating in the one in-plane direction along the arrangement axis D. Here, for example, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the cholesteric liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the cholesteric liquid crystal layer 34, the single period Λ is repeated in the arrangement axis D direction, that is, in the one in-plane direction in which the direction of the optical axis 40A changes while continuously rotating. In the liquid crystal diffraction element, the single period Λ is the period of the diffraction structure.

On the other hand, in the liquid crystal compound 40 forming the cholesteric liquid crystal layer 34, the directions of the optical axes 40A are the same in the direction (in FIG. 3, the Y direction) perpendicular to the arrangement axis D direction, that is, the Y direction perpendicular to the one in-plane direction in which the optical axis 40A continuously rotates.

In other words, in the liquid crystal compound 40 forming the cholesteric liquid crystal layer 34, angles between the optical axes 40A of the liquid crystal compound 40 and the arrow X direction are the same in the Y direction.

In a case where a cross-section of the cholesteric liquid crystal layer in a thickness direction is observed with a scanning electron microscope (SEM), a stripe pattern in which bright portions and dark portions derived from a cholesteric liquid crystalline phase are alternately arranged is observed. The cross-section of the cholesteric liquid crystal layer in the thickness direction is a cross-section in a direction perpendicular to a main surface and is a cross-section in a laminating direction of the respective layers (films).

In a typical cholesteric liquid crystal layer not having the liquid crystal alignment pattern, the stripe pattern of the bright portions and the dark portions are parallel to a main surface.

On the other hand, in a case where a cross-section of the cholesteric liquid crystal layer 34 having the liquid crystal alignment pattern shown in FIG. 2 in a thickness direction, that is, an X-Z plane is observed with a SEM, as conceptually shown in FIG. 4, a stripe pattern where the bright portions 42 and the dark portions 44 that are alternately arranged is tilted at a predetermined angle with respect to the main surface (X-Y plane) is observed.

In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 4, two bright portions 42 and two dark portions 44 correspond to one helical pitch (one helical turn), that is, the helical pitch P.

Hereinafter, an effect of diffraction by the cholesteric liquid crystal layer 34 having the liquid crystal alignment pattern will be described.

In the cholesteric liquid crystal layer of the related art not having the liquid crystal alignment pattern, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane).

Accordingly, in a case where a cross-section (X-Z plane) of the typical cholesteric liquid crystal layer in a thickness direction is observed with a SEM, as described above, the bright portions and the dark portions that are alternately arranged are parallel to the main surface (X-Y plane), that is, a direction in which the bright portions and the dark portions are alternately arranged is perpendicular to the main surface.

The cholesteric liquid crystalline phase has specular reflectivity. Therefore, in a case where light is incident from the normal direction into the cholesteric liquid crystal layer, the light is reflected in the normal direction.

On the other hand, as described above, the cholesteric liquid crystal layer 34 has the liquid crystal alignment pattern in which the optical axis 40A changes while continuously rotating in the arrangement axis D direction in a plane (the predetermined one in-plane direction).

Figure 5:
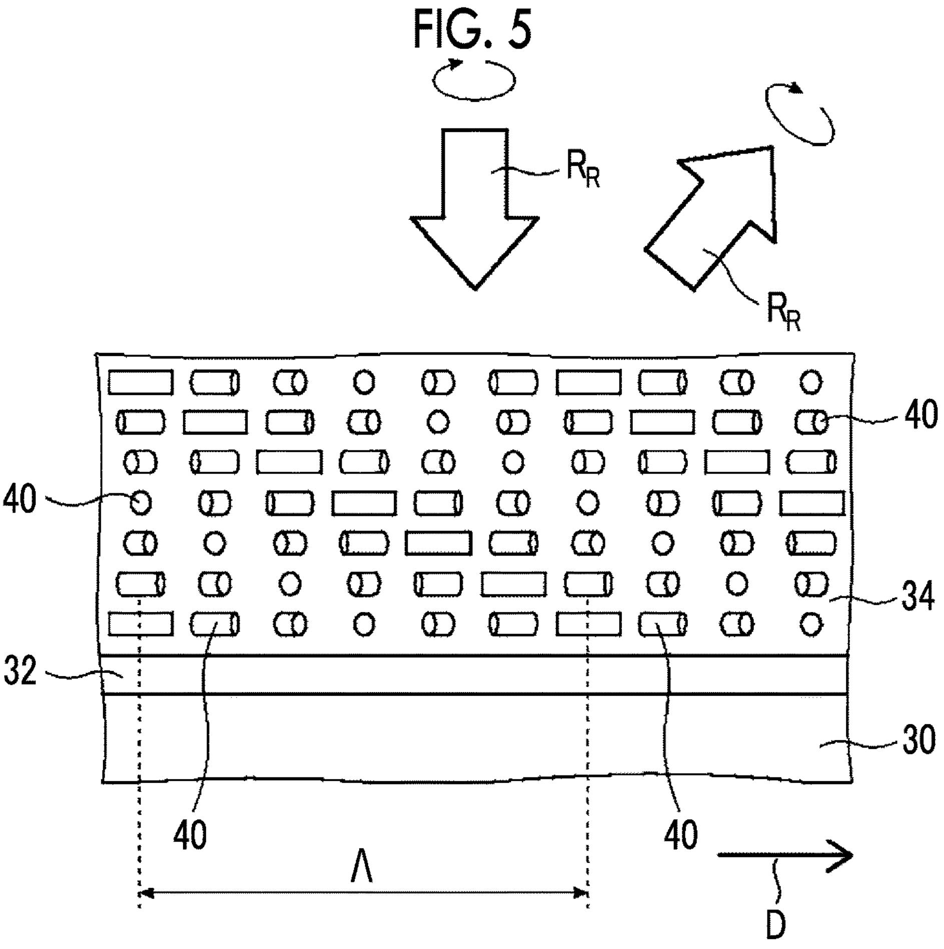
FIG. 5 is a conceptual diagram showing an action of the cholesteric liquid crystal layer shown in FIG. 3.

The cholesteric liquid crystal layer 34 having the liquid crystal alignment pattern reflects incident light in a state where it is tilted in the arrangement axis D direction with respect to the specular reflection. Hereinafter, the description will be made with reference to FIG. 5.

For example, the cholesteric liquid crystal layer 34 selectively reflects right circularly polarized light $R_R$ of red light. Accordingly, in a case where light is incident into the cholesteric liquid crystal layer 34, the cholesteric liquid crystal layer 34 reflects only right circularly polarized light $R_R$ of red light and allows transmission of the other light.

Here, in the cholesteric liquid crystal layer 34, the optical axis 40A of the liquid crystal compound 40 changes while rotating in the arrangement axis D direction (the one in-plane direction).

In addition, the liquid crystal alignment pattern formed in the cholesteric liquid crystal layer 34 is a pattern that is periodic in the arrangement axis D direction. Therefore, as conceptually shown in FIG. 5, the right circularly polarized light $R_R$ of red light incident into the cholesteric liquid crystal layer 34 is diffracted in a direction corresponding to the period of the liquid crystal alignment pattern without being specularly reflected, and is diffracted and reflected in a direction tilted in the arrangement axis D direction with respect to the XY plane (the main surface of the cholesteric liquid crystal layer).

Therefore, by using the cholesteric liquid crystal layer 34 that is the reflective liquid crystal diffraction element as the incidence liquid crystal layer of the incidence portion 14, light incident from a direction perpendicular to the main surface of the light guide plate 12 can be diffracted and reflected at an angle at which total reflection occurs in the light guide plate such that the light is incident into the light guide plate 12.

In addition, by using the cholesteric liquid crystal layer 34 as the emission liquid crystal layer of the emission portion 16, light that is totally reflected and propagates in the light guide plate 12 can be diffracted and reflected in a direction perpendicular to the main surface of the light guide plate 12 such that the light is emitted from the light guide plate 12.

In the cholesteric liquid crystal layer 34, by appropriately setting the arrangement axis D direction as the one in-plane direction in which the optical axis 40A rotates, the diffraction direction, that is, the reflection direction of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the R incidence liquid crystal layer 14R, the G incidence liquid crystal layer 14G, and the B incidence liquid crystal layer 14B forming the incidence portion 14, depending on the turning direction of circularly polarized light to be selectively reflected, that is, the helical turning direction, the arrangement axis D direction and the rotation direction of the optical axis 40A in the liquid crystal alignment pattern are set such that incident light is appropriately directed to the emission portion 16.

On the other hand, in the R emission liquid crystal layer 16R, the G emission liquid crystal layer 16G, and the B emission liquid crystal layer 16B forming the emission portion 16, depending on the turning direction of circularly polarized light to be selectively reflected, that is, the helical turning direction, the arrangement axis D direction and the rotation direction of the optical axis 40A in the liquid crystal alignment pattern are set such that incident light is appropriately emitted to the observation position by the user U.

In the liquid crystal diffraction element, in the liquid crystal alignment pattern of the liquid crystal compound in the liquid crystal layer, the single period Λ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating is the periodic direction of the diffraction structure.

In the optical element 10 according to the embodiment of the present invention, the length of the single period Λ of the diffraction element is not particularly limited, and may be appropriately adjusted depending on the incidence angle into the light guide plate 12, the size of diffraction of light for emitting the light from the light guide plate 12, and the like.

The length of the single period Λ is preferably 0.1 to 10 μm, more preferably 0.15 to 2 μm, and still more preferably 0.2 to 1 μm.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to specular reflection of incidence light.

In addition, in the liquid crystal layer having the liquid crystal alignment pattern, the reflection angle (diffraction angle) of light varies depending on the wavelength of light to be reflected. Specifically, as the wavelength of light increases, the reflected light is largely tilted with respect to the specular reflection of the incidence light.

Accordingly, in the optical element according to the embodiment of the present invention, in the laminate in which the plurality of liquid crystal layers (cholesteric liquid crystal layers) are laminated, it is preferable that a permutation of wavelengths of light to be selectively reflected and a permutation of the single periods A in the liquid crystal layers match each other.

Specifically, in the optical element 10, in the R incidence liquid crystal layer 14R, the G incidence liquid crystal layer 14G, and the B incidence liquid crystal layer 14B forming the incidence portion 14, the wavelength of light to be selectively reflected decreases in the order of the R incidence liquid crystal layer 14R, the G incidence liquid crystal layer 14G, and the B incidence liquid crystal layer 14B. Accordingly, the single period Λ also decreases in the order of the R incidence liquid crystal layer 14R, the G incidence liquid crystal layer 14G, and the B incidence liquid crystal layer 14B.

On the other hand, in the R emission liquid crystal layer 16R, the G emission liquid crystal layer 16G, and the B emission liquid crystal layer 16B forming the emission portion 16, the wavelength of light to be selectively reflected decreases in the order of the R emission liquid crystal layer 16R, the G emission liquid crystal layer 16G, and the B emission liquid crystal layer 16B. Accordingly, the single period Λ also decreases in the order of the R emission liquid crystal layer 16R, the G emission liquid crystal layer 16G, and the B emission liquid crystal layer 16B.

Regarding this point, the same can also be applied to the case where the number of the liquid crystal layers in each of the incidence portion 14 and the emission portion 16 is 2 or 4 or more.

With this configuration, the incidence directions of the red image R, the green image G, and the blue image B into the light guide plate 12 by the incidence portion 14 are made to match each other. Further, with this configuration, the emission directions of the red image R, the green image G, and the blue image B emitted from the emission portion 16 can be made to be the same.

As a result, a color image having no color shift can be emitted from the light guide plate 12 to the observation position by the user U of AR glasses.

In the example shown in FIG. 2, a configuration in which, on the X-Z plane of the cholesteric liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 6, a configuration in which, on the X-Z plane of the cholesteric liquid crystal layer 34, the optical axes 40A of the liquid crystal compound 40 is aligned to be tilted with respect to the main surface (X-Y plane) may be adopted.

Figure 6:
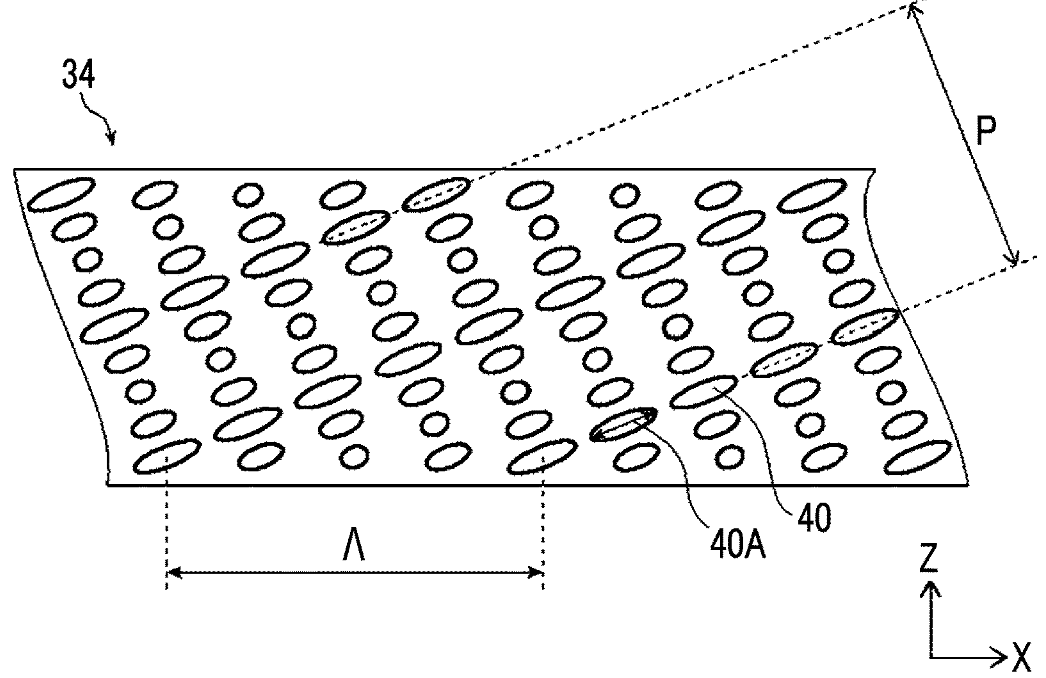
FIG. 6 is a diagram conceptually showing another example of the cholesteric liquid crystal layer.

In addition, the example shown in FIG. 6 shows the configuration in which, on the X-Z plane of the cholesteric liquid crystal layer 34, the tilt angle of the liquid crystal compound 40 with respect to the main surface (X-Y plane) is uniform in the thickness direction (Z direction). However, the present invention is not limited to this configuration. In the cholesteric liquid crystal layer 34, a region where the tilt angle of the liquid crystal compound 40 varies in the thickness direction may be provided.

Figure 7:
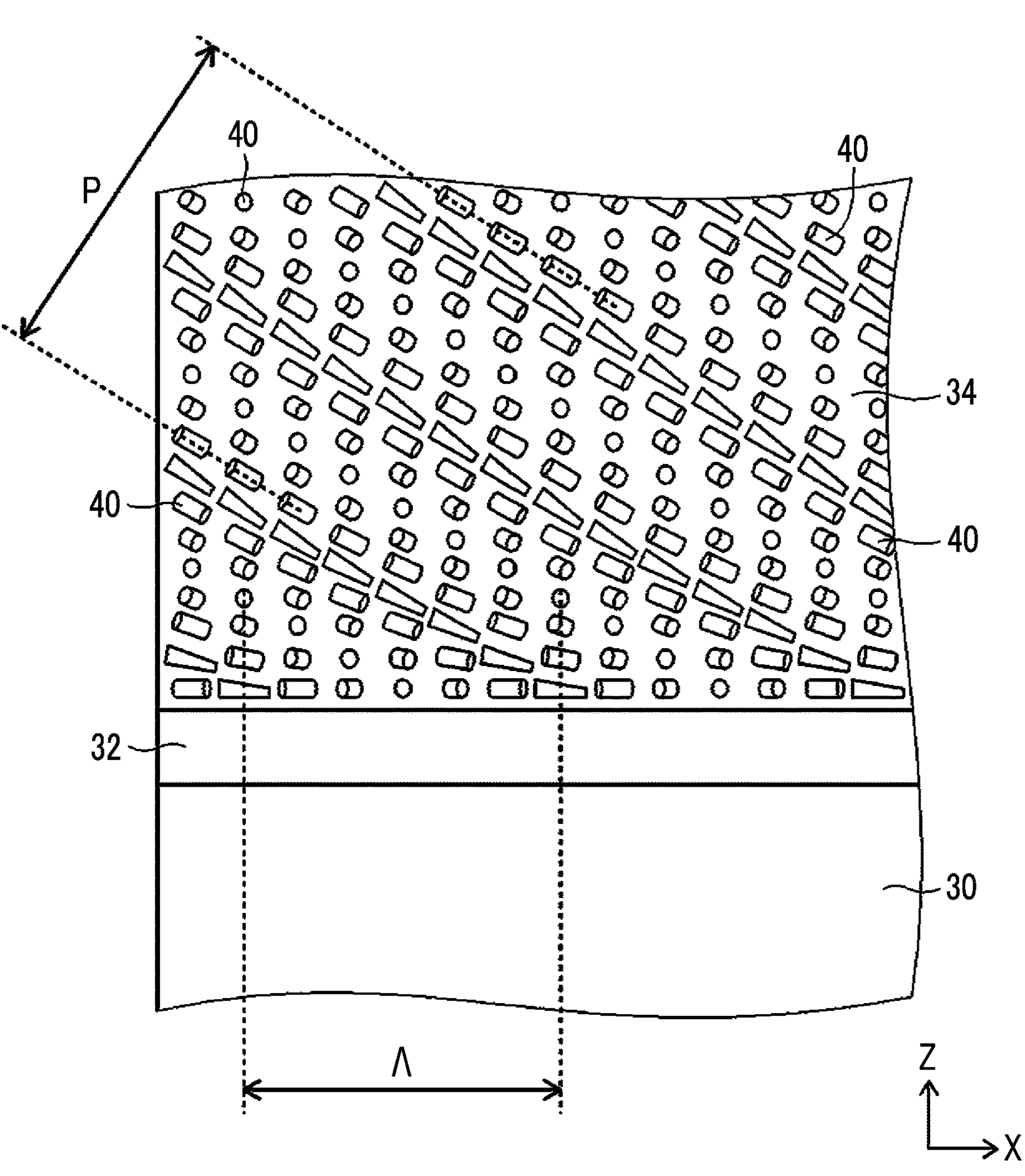
FIG. 7 is a diagram conceptually showing still another example of the cholesteric liquid crystal layer.

For example, in an example shown in FIG. 7, the optical axis 40A of the liquid crystal compound 40 at an interface of the liquid crystal layer on the photo-alignment film 32 side is parallel to the main surface (the pretilt angle is 0°), the tilt angle of the liquid crystal compound 40 increases in a direction away from the interface on the photo-alignment film 32 side to the thickness direction, and the liquid crystal compound is aligned at a given tilt angle on another interface (air interface) side.

This way, the cholesteric liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 45° and more preferably 12° to 22°. The average tilt angle can be measured by observing the X-Z plane of the cholesteric liquid crystal layer 34 with a polarization microscope. In particular, it is preferable that, on the X-Z plane of the cholesteric liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the arithmetic mean value thereof.

Light that is vertically incident into the cholesteric liquid crystal layer 34 (diffraction element) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertical incidence.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the cholesteric liquid crystal layer 34.

By pretilting the photo-alignment film on the support side interface, the tilt angle of the liquid crystal compound can be controlled. For example, by exposing the photo-alignment film to ultraviolet light from the front and subsequently obliquely exposing the photo-alignment film during the formation of the photo-alignment film, the liquid crystal compound in the liquid crystal layer formed on the photo-alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the photo-alignment film. In this case, the additive can be used as a factor for further improving the diffraction efficiency.

This additive can also be used for controlling the pretilt angle on the air side interface.

Here, in a cross-section of the cholesteric liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is the minimum in any one of a slow axis plane or a fast axis plane is tilted from the normal direction. Specifically, it is preferable that an absolute value of the measured angle between the direction in which the in-plane retardation Re is the minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

<Film Thickness Distribution Requirement of Incidence Liquid Crystal Layer and Emission Liquid Crystal Layer>

The R incidence liquid crystal layer 14R, the G incidence liquid crystal layer 14G, and the B incidence liquid crystal layer 14B forming the incidence portion 14 are formed of the cholesteric liquid crystal layer 34 that is the above-described reflective liquid crystal diffraction element.

Likewise, the R emission liquid crystal layer 16R, the G emission liquid crystal layer 16G, and the B emission liquid crystal layer 16B forming the emission portion 16 are formed of the cholesteric liquid crystal layer 34 that is the above-described reflective liquid crystal diffraction element.

Here, in the optical element 10 according to the embodiment of the present invention, in the incidence portion 14 and the emission portion 16, at least one of the liquid crystal layers has film thickness uniformity. Specifically, in the incidence portion 14 and the emission portion 16, at least one liquid crystal layer satisfies the following film thickness distribution requirement.

In the present invention, the film thickness distribution requirement is as described above.

The film thickness distribution requirement is determined by observing the cross-section of the liquid crystal layer (cholesteric liquid crystal layer) in the thickness direction with a scanning electron microscope (SEM) at a magnification of 10000-fold.

Here, during the determination of the in-plane direction of the liquid crystal layer, in a case where laser light is incident into the liquid crystal layer at various incidence angles in various orientation directions, the incidence light is diffracted, and a light guide direction of the emitted light is determined. As a result, the in-plane direction of the liquid crystal alignment pattern in which the direction of the optical axis derived from the liquid crystal compound in the liquid crystal layer changes while continuously rotating can be determined. In the present invention, the film thickness distribution requirement is determined by observing a cross-section in a direction parallel to the in-plane direction of the liquid crystal alignment pattern.

Figure 10:
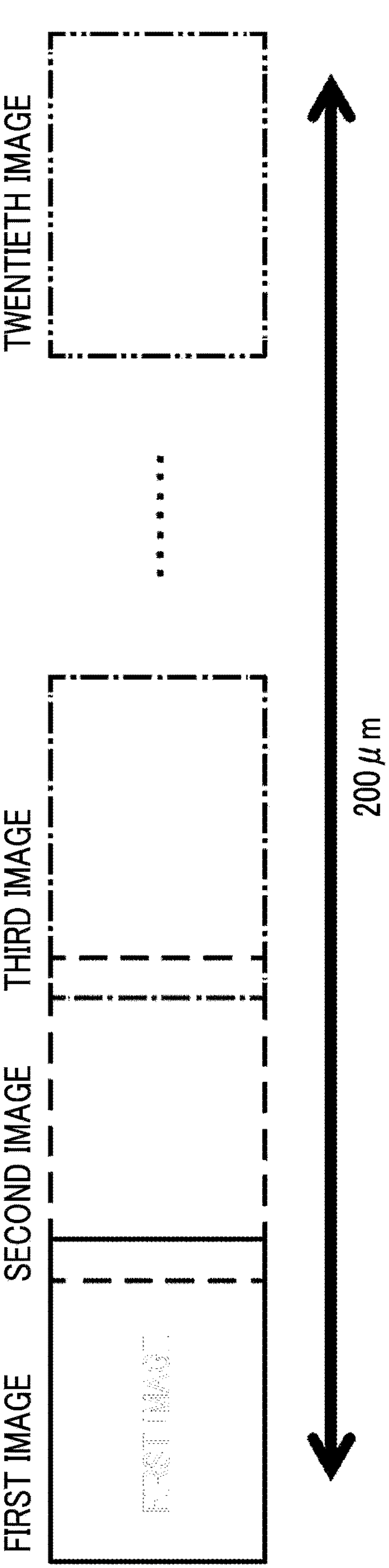
FIG. 10 is a conceptual diagram showing a film thickness distribution requirement.

The observation of the cross-section of the liquid crystal layer with the SEM at a magnification of 10000-fold is performed while continuously moving an observation position in the in-plane direction of the liquid crystal layer to perform an operation in which 20 images in a range of 200 μm in the in-plane direction of the liquid crystal layer are acquired (refer to FIG. 10).

Using the acquired images, a difference between a maximum film thickness and a minimum film thickness of the liquid crystal layer in the range of 200 μm in the in-plane direction of the liquid crystal layer is acquired.

This operation is performed on any 10 cross-sections.

An arithmetic mean value of the acquired differences between the maximum film thicknesses and the minimum film thicknesses in the 10 cross-sections is obtained.

In a case where the obtained arithmetic mean value is 0.1 μm or less, the liquid crystal layer is determined to satisfy the film thickness distribution requirement in the present invention. The obtained arithmetic mean value is preferably 0.07 μm or less and more preferably 0.03 μm or less.

The optical element 10 in the example shown in the drawing is used for AR glasses. Therefore, in a preferable example, the cholesteric liquid crystal layer 34 that is the reflective liquid crystal diffraction element is used for the incidence portion 14 and the emission portion 16. As a result, as described above, an image displayed by a display is caused to be incident into the light guide plate 12 by the incidence portion 14, is totally reflected and propagates in the light guide plate 12, and is emitted from the light guide plate 12 by the emission portion 16 such that the image can be emitted to the observation position by the user U.

In addition, the cholesteric liquid crystal layer 34 selectively reflects circularly polarized light in a specific wavelength range having a specific turning direction, and allows transmission of the other light. Accordingly, by laminating the liquid crystal layers in different wavelength ranges (selective reflection center wavelengths) where light is selectively reflected, a full color image of the red image R, the green image G, and the blue image B as in the example shown in the drawing can be handled, or a color image of two colors or the like can also be handled.

Here, according to an investigation by the present inventors, it was found that, in a case where the optical element where the liquid crystal layers functioning as the liquid crystal diffraction element, for example, the cholesteric liquid crystal layers 34 having the above-described liquid crystal alignment pattern are laminated is used as a diffraction element for incidence or emission of light from or to a light guide plate of AR glasses, an image to be displayed may be blurred.

The present inventors conducted a thorough investigation on the reason for the blurriness of the image. As a result, it was found that, in the optical element where the liquid crystal layers functioning as the liquid crystal diffraction element, for example, the cholesteric liquid crystal layers 34 having the above-described liquid crystal alignment pattern are laminated, a distribution of diffraction angle may be generated in a plane of the liquid crystal layer.

In a case where a distribution of diffraction angle is generated in a plane of the liquid crystal layer, for example, in AR glasses or the like, an image to be displayed is blurred without being emitted to an appropriate position at the observation position by the user U. In particular, in a case where the distribution of diffraction angle is generated in the incidence portion, the blurriness of the image increases.

The present inventors conducted a thorough investigation on the reason for this. As a result, it was found that the blurriness of the image, that is, the distribution of diffraction angle causes film thickness unevenness (variation in film thickness) of the lower liquid crystal layer, that is, the liquid crystal layer that is closer to the substrate among the laminated liquid crystal layers. Further, the present inventor found that the distribution of diffraction angle causes not fine unevenness of the lower liquid crystal layer but moderate film thickness unevenness such as waviness of the lower liquid crystal layer.

Figure 9:
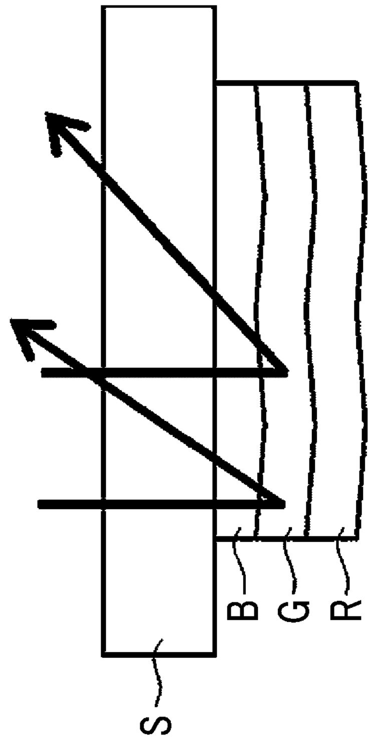
FIG. 9 is a conceptual diagram showing an action of a laminate.
Figure 9:
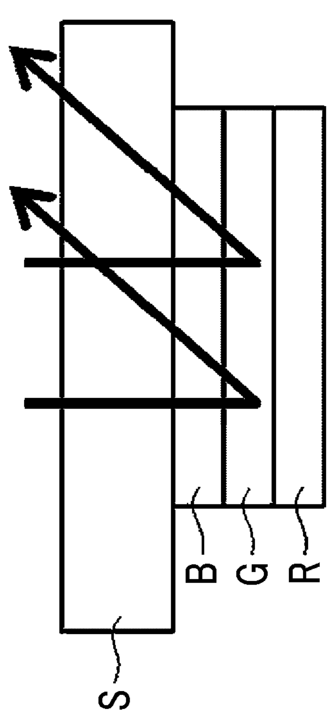

As conceptually shown in FIG. 9, a reflective layer B, a reflective layer G, and a reflective layer R consisting of the cholesteric liquid crystal layers 34 having the above-described liquid crystal alignment pattern are laminated in this order on the substrate S.

In this case, as shown on the left side of FIG. 9, in a case where all of the reflective layers have no film thickness unevenness, all of the reflective layer B, the reflective layer G, and the reflective layer R can reflect light from the entire surface at the same diffraction angle.

On the other hand, as shown on the right side of FIG. 9, for example in a case where the reflective layer B that is closest to the substrate S has film thickness unevenness, the reflective layer G that is laminated on a surface of the reflective layer B (opposite to the substrate S) has a tilted interface with the reflective layer B. As a result, in the reflective layer G, in a plane, the angle of alignment (cholesteric alignment) of the cholesteric liquid crystalline phase of the liquid crystal compound changes in a plane. Further, the reflective layer R laminated on the reflective layer G has a region where an interface with the reflective layer G is tilted. Therefore, likewise, in the reflective layer G, in a plane, the angle of alignment of the cholesteric liquid crystalline phase of the liquid crystal compound changes in a plane.

As a result, as shown on the right side of FIG. 9, in the reflective layer G (reflective layer R), a distribution of diffraction angle is generated in a plane, and thus an image is blurred.

On the other hand, in the optical element 10 according to the embodiment of the present invention, at least one of the incidence liquid crystal layers forming the incidence portion 14 and at least one of the emission liquid crystal layers forming the emission portion 16 satisfy the film thickness distribution requirement where the arithmetic mean value of the acquired differences between the maximum film thicknesses and the minimum film thicknesses in the ranges of 200 μm in the 10 cross-sections is 0.1 μm or less. In the liquid crystal layer that satisfies the film thickness distribution requirement, moderate film thickness unevenness such as waviness is extremely small.

As a result, as shown on the left side of FIG. 9, in each of the liquid crystal layers, the distribution of diffraction angle in a plane is extremely small, and the occurrence of blurriness in an image of each of colors for use in AR glasses can be prevented.

In the optical element according to the embodiment of the present invention, in the incidence portion 14, at least one of the R incidence liquid crystal layer 14R, the G incidence liquid crystal layer 14G, and the B incidence liquid crystal layer 14B may satisfy the film thickness distribution requirement.

In addition, in the emission portion 16, at least one of the R emission liquid crystal layer 16R, the G emission liquid crystal layer 16G, and the B emission liquid crystal layer 16B may satisfy the film thickness distribution requirement.

Here, the distribution of diffraction angle generated by film thickness unevenness is not generated by the liquid crystal layer having film thickness unevenness and is generated by the liquid crystal layer laminated on the liquid crystal layer having film thickness unevenness. The lower side is the substrate side, and the upper side is the side opposite to the substrate.

That is, the distribution of diffraction angle generated by film thickness unevenness is generated in the liquid crystal layer that is positioned distant from the substrate with respect to the liquid crystal layer having film thickness unevenness.

In consideration of this point, it is preferable that, among the laminated liquid crystal layers, at least the liquid crystal layer that is positioned at an end part in the laminating direction satisfies the film thickness distribution requirement, and it is more preferable that at least the liquid crystal layer that is closest to the substrate side satisfies the film thickness distribution requirement.

That is, in the example shown in the drawing, it is preferable that at least the B incidence liquid crystal layer 14B in the incidence portion 14 satisfies the film thickness distribution requirement. In addition, it is preferable that at least the B emission liquid crystal layer 16B in the emission portion 16 satisfies the film thickness distribution requirement.

In addition, due to the same reason, it is more preferable that at least the liquid crystal layers other than the liquid crystal layer that is most distant from the substrate, that is, at least the liquid crystal layers other than the liquid crystal layer as the upper most layer satisfy the film thickness distribution requirement.

That is, in the optical element 10 in the example shown in the drawing, it is more preferable that at least the B incidence liquid crystal layer 14B and the G incidence liquid crystal layer 14G in the incidence portion 14 satisfy the film thickness distribution requirement. In addition, it is more preferable that at least the B emission liquid crystal layer 16B and the G emission liquid crystal layer 16G in the emission portion 16 satisfy the film thickness distribution requirement.

Further, in the optical element according to the embodiment of the present invention, it is most preferable that all of the liquid crystal layers forming the laminate satisfy the film thickness distribution requirement.

That is, in the optical element 10 in the example shown in the drawing, it is most preferable that the R incidence liquid crystal layer 14R, the B incidence liquid crystal layer 14B, and the G incidence liquid crystal layer 14G in the incidence portion 14 satisfy the film thickness distribution requirement. In addition, it is most preferable that the R emission liquid crystal layer 16R, the G emission liquid crystal layer 16G, and the B emission liquid crystal layer 16B in the emission portion 16 satisfy the film thickness distribution requirement.

In a preferable aspect, in the optical element 10 in the example shown in the drawing, each of the incidence portion 14 and the emission portion 16 is the laminate in the optical element according to the embodiment of the present invention where the liquid crystal layers that are laminated have the predetermined liquid crystal alignment pattern and at least one of the liquid crystal layers satisfies the film thickness distribution requirement. However, the present invention is not limited to this configuration.

For example, in the optical element according to the embodiment of the present invention including the incidence portion 14 and the emission portion 16 on the light guide plate 12 as the substrate, only the incidence portion 14 may be the laminate in the optical element according to the embodiment of the present invention, and only the emission portion 16 may be the laminate according to the embodiment of the present invention. In the optical element 10 in the example shown in the drawing including the incidence portion 14 and the emission portion 16 on the light guide plate 12, it is preferable that at least the incidence portion 14 is the laminate according to the embodiment of the present invention. Further, on the optical element 10 in the example shown according to the embodiment of the present invention including the incidence portion 14 and the emission portion 16 on the light guide plate 12, it is more preferable that each of the incidence portion 14 and the emission portion 16 is the laminate according to the embodiment of the present invention as in the example shown in the drawing.

<<Method of Forming Cholesteric Liquid Crystal Layer>>

The cholesteric liquid crystal layer 34 that includes the R incidence liquid crystal layer 14R, the G incidence liquid crystal layer 14G, and the B incidence liquid crystal layer 14B forming the incidence portion 14 and the R emission liquid crystal layer 16R, the G emission liquid crystal layer 16G, and the B emission liquid crystal layer 16B forming the emission portion 16 can be formed, for example, by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is maintained. Typically, it is preferable that the structure in which a predetermined liquid crystal phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs “0082” to “0090” of JP2014-119605A, compounds described in paragraphs “0031” to “0034” of JP2012-203237A, exemplary compounds described in paragraphs “0092” and “0093” of JP2005-99248A, exemplary compounds described in paragraphs “0076” to “0078” and paragraphs “0082” to “0085” of JP2002-129162A, and fluorine (meth)acrylate polymers described in paragraphs “0018” to “0043” of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

—Solvent—

In a case where the cholesteric liquid crystal layer 34 is formed, it is preferable that the liquid crystal composition is used as liquid.

Accordingly, it is preferable that the liquid crystal composition includes a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

Here, in order to form the cholesteric liquid crystal layer 34 that satisfies the film thickness distribution requirement, it is preferable to increase the temperature and the time of drying and/or heating (alignment) of the applied liquid crystal composition.

In consideration of this point, it is preferable to use a solvent having a high boiling point to some extent. Specifically, a solvent having a boiling point of 95° C. or higher is preferable, and a solvent having a boiling point of 110° C. or higher is more preferable. The solvent may be a mixed solvent obtained by mixing a solvent having a high boiling point with a solvent having a low boiling point.

Specific examples of the solvent to be used include cyclopentanone, cyclohexanone, methyl isobutyl ketone, toluene, and a mixed solvent of methyl ethyl ketone and cyclopentanone.

In a case where the cholesteric liquid crystal layer 34 is formed, it is preferable that the liquid crystal layer is formed by applying the above-described liquid crystal composition to a surface where the cholesteric liquid crystal layer 34 is to be formed, aligning the liquid crystal compound to a state of a liquid crystalline phase, and curing the liquid crystal compound.

That is, in a case where the cholesteric liquid crystal layer 34 is formed on the photo-alignment film 32, it is preferable that the liquid crystal layer obtained by immobilizing a cholesteric liquid crystalline phase is formed by applying the liquid crystal composition to the photo-alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and heated and then is cured to form the liquid crystal layer. In the drying and heating step, the liquid crystal compound in the liquid crystal composition only has to be aligned to a cholesteric liquid crystalline phase.

Here, in order to form the cholesteric liquid crystal layer 34 that satisfies the film thickness distribution requirement, it is preferable to heat (align) the applied liquid crystal composition at a high temperature to some extent. That is, by increasing the heating temperature, the surface of the coating film of the liquid crystal composition can be made uniform (leveled), and thus the cholesteric liquid crystal layer 34 that satisfies the above-described film thickness distribution requirement can be formed.

However, in a case where the heating temperature is excessively high, the liquid crystal layer is isotropic without being aligned to a cholesteric liquid crystalline phase.

In consideration of this point, the heating temperature in this case is preferably 90° C. to 200° C., more preferably 90° C. to 130° C., and still more preferably 90° C. to 120° C.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer 34 is not particularly limited, and the thickness with which a required light reflectivity can be obtained may be appropriately set depending on the use of the diffraction element, the light reflectivity required for the liquid crystal layer, the material for forming the cholesteric liquid crystal layer 34, and the like.

<Other Liquid Crystal Layers (Optically-Anisotropic Layers)>

In the optical element in the example shown in the drawing, as the incidence liquid crystal layer in the incidence portion 14 and the emission liquid crystal layer in the emission portion 16, a reflective liquid crystal diffraction element including the cholesteric liquid crystal layer 34 is used. However, the present invention is not limited to this configuration.

For example, a liquid crystal layer can also be used that functions as a transmissive liquid crystal diffraction element having the liquid crystal alignment pattern where the direction of the optical axis derived from the liquid crystal compound continuously rotates in at least one in-plane direction and in which the liquid crystal compound does not form a cholesteric liquid crystalline phase in the thickness direction. The liquid crystal diffraction element may have a configuration in which the liquid crystal compound is twisted and rotates in the thickness direction to some extent that a cholesteric liquid crystalline phase is not formed.

In addition, in the present invention, in the incidence portion 14 and the emission portion 16, different liquid crystal diffraction elements may be used. For example, the reflective liquid crystal diffraction element including the cholesteric liquid crystal layer 34 may be used in the incidence portion 14, and the above-described transmissive liquid crystal diffraction element may be used in the emission portion 16.

[Method of Preparing Incidence Portion and Emission Portion]

The incidence portion 14 and the emission portion 16 can be prepared using various well-known methods. It is preferable to use a method using transfer described below.

Basically, the incidence portion 14 and the emission portion 16 can be formed using the same method. Therefore, in the following description, the incidence portion 14 will be described as a representative example.

First, as described above, a coating liquid including the photo-alignment material for forming the photo-alignment film 32 is applied to the support 30 and is dried. Next, the coating liquid is exposed by the exposure device 60 shown in FIG. 8 to form the alignment pattern, and the photo-alignment film 32 is formed.

On the other hand, the liquid crystal compound 40, the chiral agent, and the like are added to the solvent to prepare the liquid crystal composition for forming the cholesteric liquid crystal layer 34. In this case, in order to form the cholesteric liquid crystal layer 34 that satisfies the film thickness distribution requirement, it is preferable to use the solvent having a high boiling point as described above.

Further, the above-described liquid crystal composition is applied to the photo-alignment film 32, the coating film is dried and heated, and the coating film is irradiated with ultraviolet to form the R incidence liquid crystal layer 14R as the cholesteric liquid crystal layer 34. In this case, by increasing the heating temperature, the R incidence liquid crystal layer 14R that satisfies the film thickness distribution requirement can be formed as described above.

Likewise, the photo-alignment film 32 is formed on the support 30, and the G incidence liquid crystal layer 14G as the cholesteric liquid crystal layer 34 is formed on the photo-alignment film 32.

Further, likewise, the photo-alignment film 32 is formed on the support 30, and the B incidence liquid crystal layer 14B as the cholesteric liquid crystal layer 34 is formed on the photo-alignment film 32.

In this case, the lengths of the single periods in the alignment patterns of the photo-alignment films 32, that is, the lengths of the single periods of the liquid crystal alignment patterns of the liquid crystal layers satisfy the R incidence liquid crystal layer 14R>the G incidence liquid crystal layer 14G>the B incidence liquid crystal layer 14B as described above.

First, the B incidence liquid crystal layer 14B is bonded to a temporary support with a weak pressure-sensitive adhesive layer. Next, the B incidence liquid crystal layer 14B is peeled off from an interface between the B incidence liquid crystal layer 14B and the photo-alignment film 32.

By bonding the B incidence liquid crystal layer 14B to glass as the light guide plate 12 and peeling the temporary support, the B incidence liquid crystal layer 14B is formed on the surface of the light guide plate 12.

In this case, before transfer, a $SiO_x$ layer or the like may be formed as an adhesive layer on the surface of the B incidence liquid crystal layer 14B on the photo-alignment film 32 side. The thickness of the adhesive layer is preferably 100 nm or less. Regarding the adhesive layer, the same can be applied to the other incidence liquid crystal layers.

Likewise, the G incidence liquid crystal layer 14G is bonded to a temporary support with a weak pressure-sensitive adhesive layer, and the G incidence liquid crystal layer 14G is peeled off from an interface between the G incidence liquid crystal layer 14G and the photo-alignment film 32. Next, by laminating the G incidence liquid crystal layer 14G on the B incidence liquid crystal layer 14B transferred to the light guide plate 12 and peeling off the temporary support, the G incidence liquid crystal layer 14G is formed on the surface of the B incidence liquid crystal layer 14B.

Further, likewise, the R incidence liquid crystal layer 14R is bonded to a temporary support with a weak pressure-sensitive adhesive layer, and the R incidence liquid crystal layer 14R is peeled off from an interface between the R incidence liquid crystal layer 14R and the photo-alignment film 32. Next, by laminating the R incidence liquid crystal layer 14R on the G incidence liquid crystal layer 14G transferred to the light guide plate 12 and peeling off the temporary support, the R incidence liquid crystal layer 14R is formed on the surface of the G incidence liquid crystal layer 14G.

As a result, the incidence portion 14 where the three liquid crystal layers (cholesteric liquid crystal layers) including the B incidence liquid crystal layer 14B, the G incidence liquid crystal layer 14G, and the R incidence liquid crystal layer 14R are laminated is formed on the surface of the light guide plate 12.

Hereinabove, the optical element according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Examples (Formation of Photo-Alignment Film)

A glass substrate was used as the support. The following coating liquid for forming a photo-alignment film was applied to the support by spin coating. The support on which the coating film of the coating liquid for forming a photo-alignment film was formed was dried using a hot plate at 60° C. for 60 seconds. As a result, a photo-alignment film was formed.

Coating Liquid for Forming Photo-Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

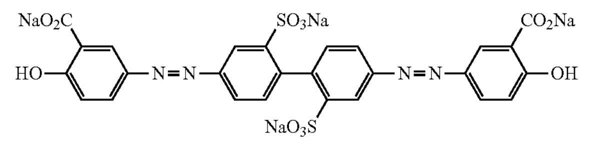

(Exposure of Photo-Alignment Film)

The photo-alignment film was exposed using the exposure device shown in FIG. 8 to form a photo-alignment film having an alignment pattern.

In the exposure device, a laser that emits laser light having a wavelength (325 nm) was used as the laser. The exposure amount of the interference light was 3000 $mJ/cm^2$. The intersecting angle (intersecting angle $\alpha$) between two laser beams was 42.3°.

(Formation of R Liquid Crystal Layer 1)

As the liquid crystal composition forming a R liquid crystal layer 1 (an R incidence liquid crystal layer and an R emission liquid crystal layer), the following composition A-1 was prepared. This composition A-1 is a liquid crystal composition forming a cholesteric liquid crystal layer in which the length of one helical pitch (helical pitch P) in the cholesteric liquid crystalline phase is 410 nm and right circularly polarized light of red (R) light is selectively reflected. The solid content concentration in the composition A-1 was 35 wt %.

Composition A-1

| | |
|---|---|
| Rod-Like liquid crystal compound L-1 | 100.00 parts by mass |
| Polymerization initiator I-1 | 3.00 parts by mass |
| Chiral agent Ch-1 | 4.6 parts by mass |
| Methyl ethyl ketone | 119.90 parts by mass |
| Cyclopentanone | 79.93 parts by mass |

Rod-Like Liquid Crystal Compound L-1

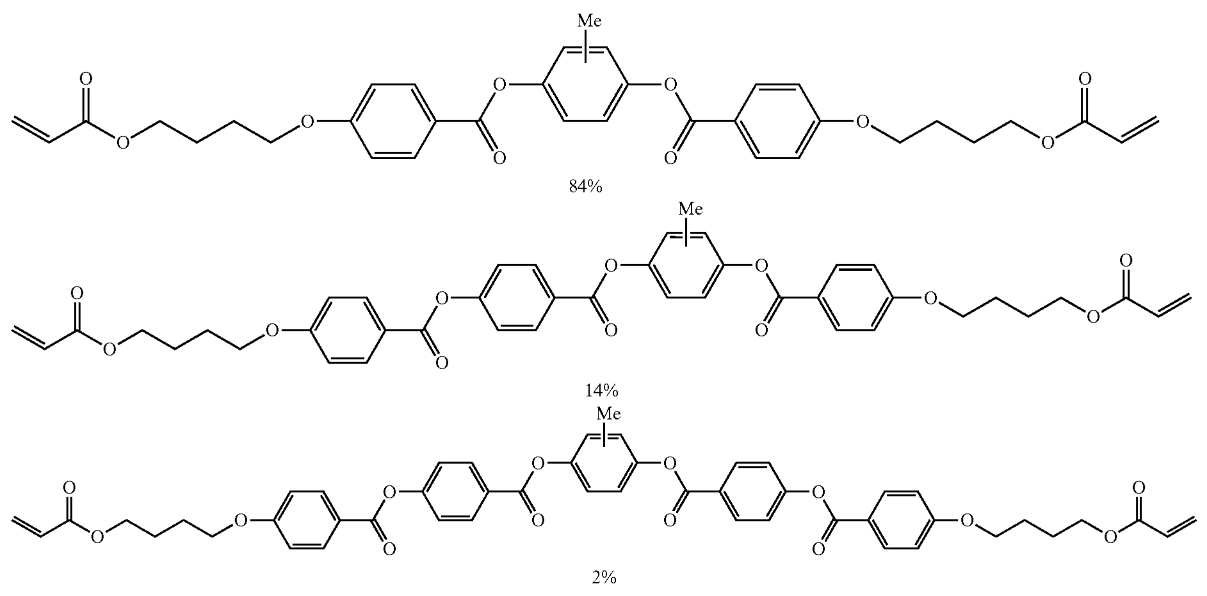

Polymerization Initiator I-1

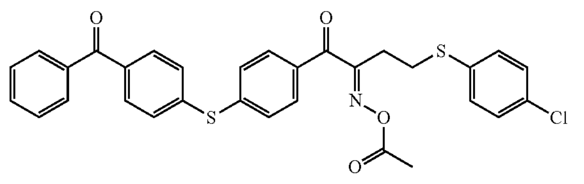 [SMILES: CC(=O)O/N=C(\CCSc1ccc(Cl)cc1)C(=O)c1ccc(Sc2ccc(C(=O)c3ccccc3)cc2)cc1]

Chiral Agent Ch-1

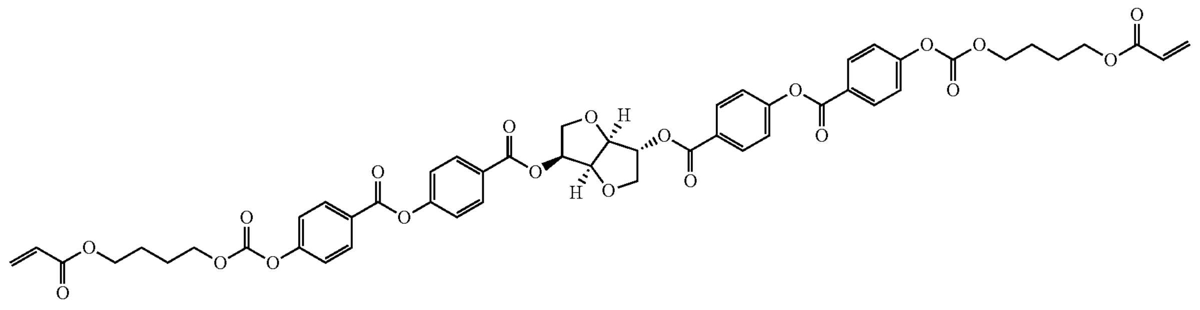 [SMILES: C=CC(=O)OCCCCOC(=O)Oc1ccc(C(=O)Oc2ccc(C(=O)O[C@H]3CO[C@@H]4[C@H]3OC[C@H]4OC(=O)c3ccc(OC(=O)c4ccc(OC(=O)OCCCCOC(=O)C=C)cc4)cc3)cc2)cc1]

The R liquid crystal layer 1 was formed by applying the composition A-1 to the photo-alignment film.

Specifically, the composition A-1 was applied to the photo-alignment film by spin coating, and the coating film was heated on a hot plate at 120° C. for 120 seconds. Next, the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and the R liquid crystal layer 1 was formed. The film thickness of the obtained R liquid crystal layer 1 was 5.2

It was verified using a polarization microscope that the liquid crystal layer of the R liquid crystal layer 1 had a periodically aligned surface as shown in FIG. 3. In a case where a cross-section of the coating layer was observed with a SEM, in the liquid crystal alignment pattern of the liquid crystal layer of the R liquid crystal layer 1, the single period Λ over which the optical axis of the liquid crystal compound rotated by 180° was 0.45 μm.

In addition, a cross-section of the formed R liquid crystal layer 1 in a thickness direction was observed with a SEM at a magnification of 10000-fold while continuously moving an observation position in an in-plane direction. As a result, 20 images in a range of 200 μm in the in-plane direction were acquired. A difference between a maximum film thickness and a minimum film thickness in the range of 200 μm in the in-plane direction was acquired from the images.

This operation was performed on any 10 cross-sections of the R liquid crystal layer 1.

An arithmetic mean value of the acquired differences between the maximum film thicknesses and the minimum film thicknesses in the 10 cross-sections of the R liquid crystal layer 1 was obtained. As a result, the arithmetic mean value of the differences between the maximum film thicknesses and the minimum film thicknesses in the R liquid crystal layer 1 was 0.05 Accordingly, the R liquid crystal layer 1 satisfies the above-described film thickness distribution requirement.

(Formation and Exposure of Photo-Alignment Film for G Liquid Crystal Layer 1)

Using the same method as the method of forming the photo-alignment film for the R liquid crystal layer 1, a photo-alignment film was formed on a surface of a glass support.

The formed photo-alignment film was exposed using the exposure device shown in FIG. 8 as described above to form a photo-alignment film having an alignment pattern using the same method as described above, except that the intersecting angle (intersecting angle $\alpha$) between two laser beams was 49.2°.

(Formation of G Liquid Crystal Layer 1 (G Incidence Liquid Crystal Layer and G Emission Liquid Crystal Layer)

A composition A-2 was prepared using the same method as that of the composition A-1, except that the addition amount of the chiral agent of the composition A-1 was changed to 5.3 parts by mass, the amount of methyl ethyl ketone was changed to 120.58 parts by mass, and the amount of cyclopentanone was changed to 80.38 parts by mass. This composition A-2 is a liquid crystal composition forming a cholesteric liquid crystal layer in which the length of one helical pitch (helical pitch P) in the cholesteric liquid crystalline phase is 360 nm and right circularly polarized light of green (G) light is selectively reflected.

A G liquid crystal layer 1 was formed using the same method as that of the R liquid crystal layer 1, except that the composition A-2 was used. In a case where the film thickness of the G liquid crystal layer 1 was measured using the same method as that of the R liquid crystal layer 1, the thickness was 4.6 μm. In addition, in the liquid crystal alignment pattern of the G liquid crystal layer 1, the single period Λ over which the optical axis of the liquid crystal compound rotated by 180° was 0.39 μm.

In the prepared G liquid crystal layer 1, the arithmetic mean value of the differences between the maximum film thicknesses and the minimum film thicknesses in the ranges of 200 μm in the 10 cross-sections was obtained using the same method as that of the R liquid crystal layer 1. As a result, the arithmetic mean value of the differences between the maximum film thicknesses and the minimum film thicknesses in the G liquid crystal layer 1 was 0.04 μm. Accordingly, the G liquid crystal layer 1 satisfies the above-described film thickness distribution requirement.

(Formation and Exposure of Photo-Alignment Film for B Liquid Crystal Layer 1)

Using the same method as the method of forming the photo-alignment film for the R liquid crystal layer 1, a photo-alignment film was formed on a surface of a glass support.

The formed photo-alignment film was exposed using the exposure device shown in FIG. 8 as described above to form a photo-alignment film having an alignment pattern using the same method as described above, except that the intersecting angle (intersecting angle $\alpha$) between two laser beams was 61.0°.

(Formation of B Liquid Crystal Layer 1 (B Incidence Liquid Crystal Layer and B Emission Liquid Crystal Layer)

A composition A-3 was prepared using the same method as that of the composition A-1, except that the addition amount of the chiral agent was changed to 6.3 parts by mass and the amount of methyl ethyl ketone was changed to 202.99 parts by mass. This composition A-3 is a liquid crystal composition forming a cholesteric liquid crystal layer in which the length of one helical pitch (helical pitch P) in the cholesteric liquid crystalline phase is 300 nm and right circularly polarized light of blue (B) light is selectively reflected.

A B liquid crystal layer 1 was formed using the same method as that of the R liquid crystal layer 1, except that the composition A-3 was used. In a case where the film thickness of the B liquid crystal layer 1 was measured using the same method as that of the R liquid crystal layer 1, the thickness was 3.8 In addition, in the liquid crystal alignment pattern of the B liquid crystal layer 1, the single period Λ over which the optical axis of the liquid crystal compound rotated by 180° was 0.32 μm.

In the prepared B liquid crystal layer 1, the arithmetic mean value of the differences between the maximum film thicknesses and the minimum film thicknesses in the ranges of 200 μm in the 10 cross-sections was obtained using the same method as that of the R liquid crystal layer 1. As a result, the arithmetic mean value of the differences between the maximum film thicknesses and the minimum film thicknesses in the B liquid crystal layer 1 was 0.04 Accordingly, the B liquid crystal layer 1 satisfies the above-described film thickness distribution requirement.

[Preparation of Optical Element 1]

(Preparation of Light Guide Plate)

As the light guide plate, glass having a thickness of 1 mm was prepared.

(Peeling of B Liquid Crystal Layer 1)

Two B liquid crystal layers 1 were prepared as an incidence liquid crystal layer and an emission liquid crystal layer. A temporary support with a weak pressure-sensitive adhesive layer for transfer (manufactured by PANAC Corporation, PANAPROTECT ST50) was bonded to the B liquid crystal layer 1, and the B liquid crystal layer 1 was peeled from an interface between the B liquid crystal layer 1 and the photo-alignment film.

(Bonding of B Liquid Crystal Layer 1 to Glass)

A $SiO_x$ layer having a thickness of 50 nm or less was formed on the surface of the peeled B liquid crystal layer 1 on the alignment film side. The formation of the $SiO_x$ layer was performed using a vapor deposition device (model number: ULEYES) manufactured by ULVAC, Inc. In this case, $SiO_2$ powder was used as a vapor deposition source.

After bonding the $SiO_x$ layer side of the B liquid crystal layer 1 as the incidence liquid crystal layer and the emission liquid crystal layer to the glass as the light guide plate, the temporary support was peeled off.

(Peeling of G Liquid Crystal Layer 1)

Two G liquid crystal layers 1 were prepared as an incidence liquid crystal layer and an emission liquid crystal layer. A temporary support including a weak pressure-sensitive adhesive layer for transfer (manufactured by PANAC Corporation, PANAPROTECT ST50) was bonded to the G liquid crystal layer 1, and the G liquid crystal layer 1 was peeled from an interface between the G liquid crystal layer and the photo-alignment film.

(Bonding of G Liquid Crystal Layer 1 to B Liquid Crystal Layer 1)

A $SiO_x$ layer having a thickness of 50 nm or less was formed on the surface of the peeled G liquid crystal layer 1 on the alignment film side. The formation of the $SiO_x$ layer was performed using a vapor deposition device (model number: ULEYES) manufactured by ULVAC, Inc. In this case, $SiO_2$ powder was used as a vapor deposition source. In addition, a $SiO_x$ layer is also formed using the same method as described above on the surface of the B liquid crystal layer 1 bonded to the light guide plate.

After bonding the $SiO_x$ layer side of the G liquid crystal layer 1 as the incidence liquid crystal layer and the emission liquid crystal layer to the B liquid crystal layer 1 bonded to the light guide plate, the temporary support was peeled off.

(Peeling of R Liquid Crystal Layer 1)

Two R liquid crystal layers 1 were prepared as incidence and emission. A temporary support including a weak pressure-sensitive adhesive layer for transfer (manufactured by PANAC Corporation, PANAPROTECT ST50) was bonded to the R liquid crystal layer 1, and the R liquid crystal layer 1 was peeled from an interface between the R liquid crystal layer 1 and the photo-alignment film.

(Bonding of R Liquid Crystal Layer 1 to G Liquid Crystal Layer 1 (Preparation of Optical Element))

A $SiO_x$ layer having a thickness of 50 nm or less was formed on the surface of the peeled R liquid crystal layer 1 on the alignment film side. The formation of the $SiO_x$ layer was performed using a vapor deposition device (model number: ULEYES) manufactured by ULVAC, Inc. In this case, $SiO_2$ powder was used as a vapor deposition source. In addition, a $SiO_x$ layer is also formed using the same method as described above on the surface of the G liquid crystal layer 1 bonded to the light guide plate.

After bonding the $SiO_x$ layer side of the R liquid crystal layer 1 as the incidence liquid crystal layer and the emission liquid crystal layer to the G liquid crystal layer 1 bonded to the light guide plate, the temporary support was peeled off.

An optical element 1 shown in FIG. 1 was prepared, the optical element 1 including, on the main surface of the light guide plate, the incidence portion where the B incidence liquid crystal layer, the G incidence liquid crystal layer, and the R incidence liquid crystal layer were laminated and the emission portion where the B emission liquid crystal layer, the G emission liquid crystal layer, and the R emission liquid crystal layer were laminated. In this example, all of the liquid crystal layers satisfy the above-described film thickness distribution requirement.

A mark representing a periodic direction was formed in advance on the side of the cholesteric liquid crystal layer to be laminated and the side of the temporary support to be laminated, and is used for bonding such that the periodic directions (arrangement axis directions) of the liquid crystal compounds in the respective liquid crystal layers were aligned.

Comparative Example (Formation of R Liquid Crystal Layer 2)

A composition A-4 was prepared using the same method as that of the composition A-1, except that the amount of methyl ethyl ketone of the composition A-1 was changed to 199.83 parts by mass and the amount of cyclopentanone was changed to 0 parts by mass. This composition A-4 is a liquid crystal composition forming a cholesteric liquid crystal layer in which the length of one helical pitch (helical pitch P) in the cholesteric liquid crystalline phase is 410 nm and right circularly polarized light of red (R) light is selectively reflected.

An R liquid crystal layer 2 was formed using the same method as that of the R liquid crystal layer 1, except that the composition A-4 was used and the heating temperature of the coating film was changed to 70° C. In a case where the film thickness of the R liquid crystal layer 2 was measured using the same method as that of the R liquid crystal layer 1, the thickness was 5.2 μm. In addition, in the liquid crystal alignment pattern of the R liquid crystal layer 2, the single period Λ over which the optical axis of the liquid crystal compound rotated by 180° was 0.45 μm.

In the prepared R liquid crystal layer 2 the arithmetic mean value of the differences between the maximum film thicknesses and the minimum film thicknesses in the ranges of 200 μm in the 10 cross-sections was obtained using the same method as that of the R liquid crystal layer 1. As a result, the arithmetic mean value of the differences between the maximum film thicknesses and the minimum film thicknesses in the R liquid crystal layer 2 was 0.20 μm. Accordingly, the R liquid crystal layer 2 does not satisfy the above-described film thickness distribution requirement.

(Formation of G Liquid Crystal Layer 2)

A composition A-5 was prepared using the same method as that of the composition A-2, except that the amount of methyl ethyl ketone of the composition A-2 was changed to 200.98 parts by mass and the amount of cyclopentanone was changed to 0 parts by mass. This composition A-5 is a liquid crystal composition forming a cholesteric liquid crystal layer in which the length of one helical pitch (helical pitch P) in the cholesteric liquid crystalline phase is 360 nm and right circularly polarized light of green (G) light is selectively reflected.

A G liquid crystal layer 2 was formed using the same method as that of the R liquid crystal layer 1, except that the composition A-5 was used and the heating temperature of the coating film was changed to 70° C. In a case where the film thickness of the G liquid crystal layer 2 was measured using the same method as that of the R liquid crystal layer 1, the thickness was 4.6 μm. In addition, in the liquid crystal alignment pattern of the G liquid crystal layer 2, the single period Λ over which the optical axis of the liquid crystal compound rotated by 180° was 0.39 μm.

In the prepared G liquid crystal layer 2, the arithmetic mean value of the differences between the maximum film thicknesses and the minimum film thicknesses in the ranges of 200 μm in the 10 cross-sections was obtained using the same method as that of the R liquid crystal layer 1. As a result, the arithmetic mean value of the differences between the maximum film thicknesses and the minimum film thicknesses in the G liquid crystal layer 2 was 0.16 μm. Accordingly, the G liquid crystal layer 2 does not satisfy the above-described film thickness distribution requirement.

(Formation of B Liquid Crystal Layer 2)

A composition A-6 was prepared using the same method as that of the composition A-3, except that the amount of methyl ethyl ketone of the composition A-3 was changed to 202.99 parts by mass and the amount of cyclopentanone was changed to 0 parts by mass. This composition A-6 is a liquid crystal composition forming a cholesteric liquid crystal layer in which the length of one helical pitch (helical pitch P) in the cholesteric liquid crystalline phase is 300 nm and right circularly polarized light of blue (B) light is selectively reflected.

A B liquid crystal layer 2 was formed using the same method as that of the R liquid crystal layer 1, except that the composition A-5 was used and the heating temperature of the coating film was changed to 70° C. In a case where the film thickness of the B liquid crystal layer 2 was measured using the same method as that of the R liquid crystal layer 1, the thickness was 3.8 μm. In addition, in the liquid crystal alignment pattern of the B liquid crystal layer 2, the single period Λ over which the optical axis of the liquid crystal compound rotated by 180° was 0.32 μm.

In the prepared B liquid crystal layer 2, the arithmetic mean value of the differences between the maximum film thicknesses and the minimum film thicknesses in the ranges of 200 μm in the 10 cross-sections was obtained using the same method as that of the R liquid crystal layer 1. As a result, the arithmetic mean value of the differences between the maximum film thicknesses and the minimum film thicknesses in the B liquid crystal layer 2 was 0.14 μm. Accordingly, the R liquid crystal layer 2 does not satisfy the above-described film thickness distribution requirement.

[Preparation of Optical Element 2]

An optical element 2 where the incidence portion and the emission portion were provided on the light guide plate was prepared using the same method as that of the optical element 1, except that the B liquid crystal layer 2 was used instead of the B liquid crystal layer 1, the G liquid crystal layer 2 was used instead of the G liquid crystal layer 1, and the R liquid crystal layer 2 was used instead of the R liquid crystal layer 1. In this example, all of the liquid crystal layers do not satisfy the above-described film thickness distribution requirement.

[Evaluation]

Using the prepared optical element, as shown in FIG. 1, an image consisting of the red image R, the green image G, and the blue image B was projected from a LCOS projector to the incidence portion and was evaluated by visual inspection at an observation position by the user U.

As a result, in a case where the optical element 1 according to Example where all of the liquid crystal layers satisfied the above-described film thickness distribution requirement was used, the image clearly seen and characters were clearly legible. On the other hand, in a case where the optical element 1 according to Comparative Example where all of the liquid crystal layers did not satisfy the above-described film thickness distribution requirement was used, the image was blurred and characters were slightly illegible.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES

10: optical element
12: light guide plate
14: incidence portion
14R: R incidence liquid crystal layer
14G: G incidence liquid crystal layer
14B: B incidence liquid crystal layer
16: emission portion
16R: R emission liquid crystal layer
16G: G emission liquid crystal layer
16B: B emission liquid crystal layer
30: support
32: photo-alignment film
34: cholesteric liquid crystal layer
40: liquid crystal compound
40A: optical axis
42: bright portion
44: dark portion
60: exposure device
62: laser
64: light source
65: λ/2 plate
68: polarization beam splitter
70A, 70B: mirror
72A, 72B: λ/4 plate
R: red image
G: green image
B: blue image
$R_R$: right circularly polarized light of red light
M: laser light
MA, MB: beam
$P_O$: linearly polarized light
$P_R$: right circularly polarized light
$P_L$: left circularly polarized light
U: user
D: arrangement axis
Λ: single period (period of diffraction structure)
P: pitch

What is claimed is:

1. An optical element comprising:

a substrate; and a laminate that is provided on the substrate and where a plurality of liquid crystal layers obtained by aligning a liquid crystal compound are laminated, wherein the liquid crystal layers forming the laminate have a liquid crystal alignment pattern in which a direction of an optical axis derived from the liquid crystal compound changes while continuously rotating in at least one in-plane direction, at least one of the liquid crystal layers forming the laminate satisfy the following film thickness distribution requirement, and the liquid crystal layers forming the laminate are cholesteric liquid crystal layers obtained by immobilizing a cholesteric liquid crystalline phase, and selectively reflect visible light, wherein the laminate comprises the liquid crystal layers, each of which selectively reflects light of a different wavelength, and wherein a permutation of wavelengths of the light to be selectively reflected by each of the liquid crystal layers and a permutation of lengths of one period of the liquid crystal alignment pattern in the liquid crystal layers match each other, film thickness distribution requirement a cross-section of the liquid crystal layer in a thickness direction is observed with a scanning electron microscope at a magnification of 10000-fold while continuously moving an observation position in an in-plane direction of the liquid crystal layer to perform an operation in which 20 images in a range of 200 μm in the in-plane direction of the liquid crystal layer are acquired to acquire a difference between a maximum film thickness and a minimum film thickness in the range of 200 μm in the in-plane direction of the liquid crystal layer, and in a case where this operation is performed on any 10 cross-sections of the liquid crystal layer, an arithmetic mean value of the acquired differences between the maximum film thicknesses and the minimum film thicknesses in the 10 cross-sections is 0.1 μm or less.

2. The optical element according to claim 1, wherein among the liquid crystal layers forming the laminate, a liquid crystal layer that is positioned at an end part in a laminating direction satisfies the film thickness distribution requirement.

3. The optical element according to claim 2, wherein among the liquid crystal layers forming the laminate, a liquid crystal layer that is closest to the substrate side satisfies the film thickness distribution requirement.

4. The optical element according to claim 1, wherein among the liquid crystal layers forming the laminate, liquid crystal layers other than a liquid crystal layer that is most distant from the substrate satisfy the film thickness distribution requirement.

5. The optical element according to claim 1, wherein all of the liquid crystal layers forming the laminate satisfy the film thickness distribution requirement.

6. The optical element according to claim 1, wherein the substrate is a light guide plate and includes an incidence portion that causes light to be incident into the light guide plate and an emission portion that emits light from the light guide plate, and at least one of the incidence portion or the emission portion is formed of the laminate.

7. The optical element according to claim 6, wherein the incidence portion is formed of the laminate.

8. The optical element according to claim 7, wherein the emission portion is formed of the laminate.

9. The optical element according to claim 1, wherein the liquid crystal compound has a tilt angle.

10. The optical element according to claim 9, wherein a region where the tilt angle of the liquid crystal compound varies is provided.

11. An optical element comprising:

a substrate; and a laminate that is provided on the substrate and where a plurality of liquid crystal layers obtained by aligning a liquid crystal compound are laminated, wherein the liquid crystal layers forming the laminate have a liquid crystal alignment pattern in which a direction of an optical axis derived from the liquid crystal compound changes while continuously rotating in at least one in-plane direction, at least one of the liquid crystal layers forming the laminate satisfy the following film thickness distribution requirement, and the liquid crystal layers forming the laminate are cholesteric liquid crystal layers obtained by immobilizing a cholesteric liquid crystalline phase, and selectively reflects visible light without absorbing light in a predetermined wavelength range, film thickness distribution requirement a cross-section of the liquid crystal layer in a thickness direction is observed with a scanning electron microscope at a magnification of 10000-fold while continuously moving an observation position in an in-plane direction of the liquid crystal layer to perform an operation in which 20 images in a range of 200 μm in the in-plane direction of the liquid crystal layer are acquired to acquire a difference between a maximum film thickness and a minimum film thickness in the range of 200 μm in the in-plane direction of the liquid crystal layer, and in a case where this operation is performed on any 10 cross-sections of the liquid crystal layer, an arithmetic mean value of the acquired differences between the maximum film thicknesses and the minimum film thicknesses in the 10 cross-sections is 0.1 μm or less.

12. The optical element according to claim 11, wherein the cholesteric liquid crystal layers do not contain a dichroic dye that absorbs light in the predetermined wavelength range.

13. The optical element according to claim 11, wherein among the liquid crystal layers forming the laminate, a liquid crystal layer that is positioned at an end part in a laminating direction satisfies the film thickness distribution requirement.

14. The optical element according to claim 11, wherein among the liquid crystal layers forming the laminate, a liquid crystal layer that is closest to the substrate side satisfies the film thickness distribution requirement.

15. The optical element according to claim 11, wherein among the liquid crystal layers forming the laminate, liquid crystal layers other than a liquid crystal layer that is most distant from the substrate satisfy the film thickness distribution requirement.

16. The optical element according to claim 11, wherein all of the liquid crystal layers forming the laminate satisfy the film thickness distribution requirement.

17. The optical element according to claim 11, wherein the laminate comprises the liquid crystal layers, each of which selectively reflects light of a different wavelength, and wherein a permutation of wavelengths of the light to be selectively reflected by each of the liquid crystal layers and a permutation of lengths of one period of the liquid crystal alignment pattern in the liquid crystal layers match each other.

18. The optical element according to claim 11, wherein the substrate is a light guide plate and includes an incidence portion that causes light to be incident into the light guide plate and an emission portion that emits light from the light guide plate, and at least one of the incidence portion or the emission portion is formed of the laminate.

19. The optical element according to claim 18, wherein the incidence portion is formed of the laminate.

20. The optical element according to claim 19, wherein the emission portion is formed of the laminate.

21. The optical element according to claim 11, wherein the liquid crystal compound has a tilt angle.

22. The optical element according to claim 21, wherein a region where the tilt angle of the liquid crystal compound varies is provided.

* * * * *